(12) United States Patent
Ahn et al.

(10) Patent No.: US 7,705,944 B2
(45) Date of Patent: Apr. 27, 2010

(54) LIQUID CRYSTAL DISPLAY DEVICE WITH A PROTECTIVE FILM PATTERNED BY A LIFT-OFF PROCESS AND FABRICATING METHOD THEREOF

(75) Inventors: Byung Chul Ahn, Anyang-si (KR); Joo Soo Lim, Gumi-si (KR); Byung Ho Park, Pohang-si (KR)

(73) Assignee: LG Display Co., Ltd., Seoul (KR)

( * ) Notice: Subject to any disclaimer, the term of this patent is extended or adjusted under 35 U.S.C. 154(b) by 1162 days.

(21) Appl. No.: 11/311,660

(22) Filed: Dec. 20, 2005

(65) Prior Publication Data

US 2006/0139549 A1    Jun. 29, 2006

(30) Foreign Application Priority Data

Dec. 24, 2004    (KR)    ................ 10-2004-0112585

(51) Int. Cl.
*G02F 1/1333*    (2006.01)
*G02F 1/1343*    (2006.01)

(52) U.S. Cl. .................... 349/138; 349/43; 349/141; 349/147; 349/187

(58) Field of Classification Search ............ 349/147, 349/148, 138

See application file for complete search history.

(56) References Cited

U.S. PATENT DOCUMENTS

| | | | | |
|---|---|---|---|---|
| 5,835,177 A * | 11/1998 | Dohjo et al. | ............ | 349/147 |
| 7,316,944 B2 * | 1/2008 | Ahn | ............ | 438/155 |
| 2001/0020994 A1 * | 9/2001 | Kaneko et al. | ............ | 349/147 |
| 2002/0085157 A1 * | 7/2002 | Tanaka et al. | ............ | 349/147 |

* cited by examiner

*Primary Examiner*—Andrew Schechter
(74) *Attorney, Agent, or Firm*—McKenna Long & Aldridge LLP

(57) ABSTRACT

A method of fabricating a liquid crystal display device includes in a first mask process, forming a first mask pattern group including a gate line, a gate electrode connected to the gate line and a common line parallel to the gate line that have a first conductive layer group structure having at least double conductive layers. A second mask process forms a gate insulating film on the first mask pattern group and a semiconductor pattern thereon. A third mask process forms a third mask pattern group including a data line, a source electrode connected to the data line and a drain electrode opposite the source electrode that have a second conductive layer group structure having at least double conductive layers, and a protective film interfacing with the third mask pattern group on the gate insulating film.

13 Claims, 23 Drawing Sheets

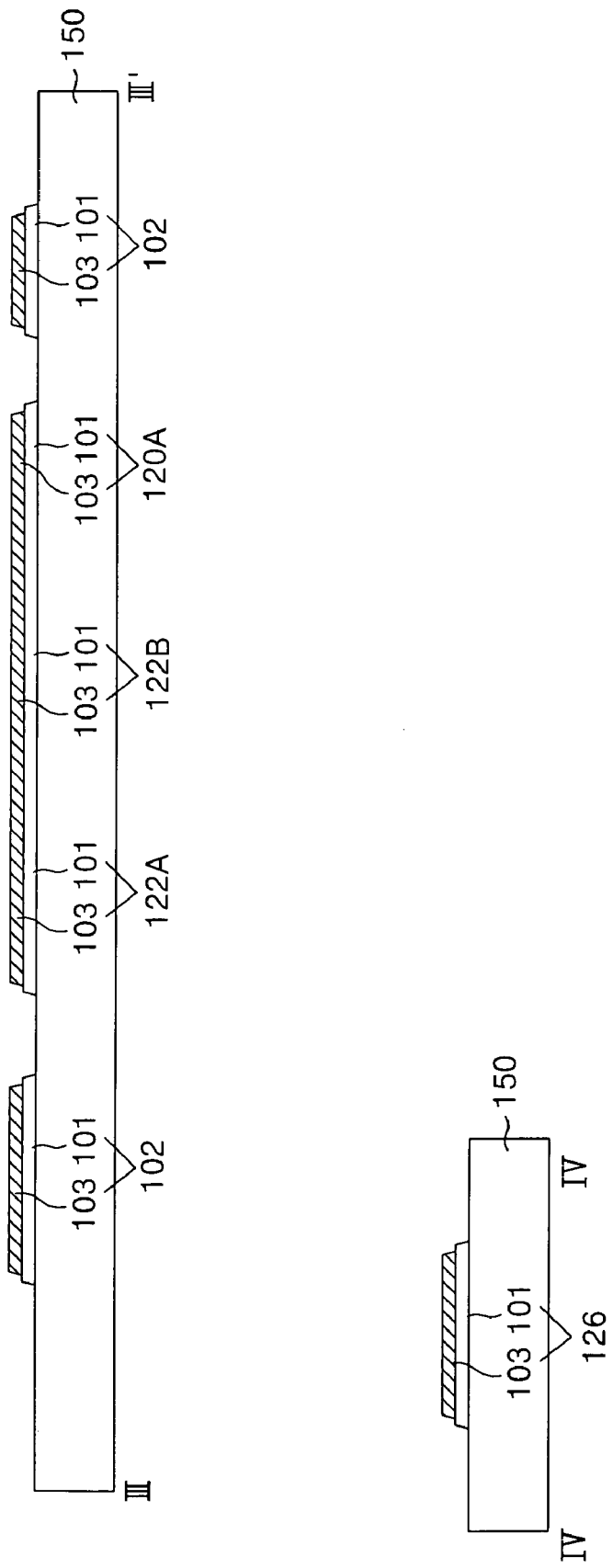

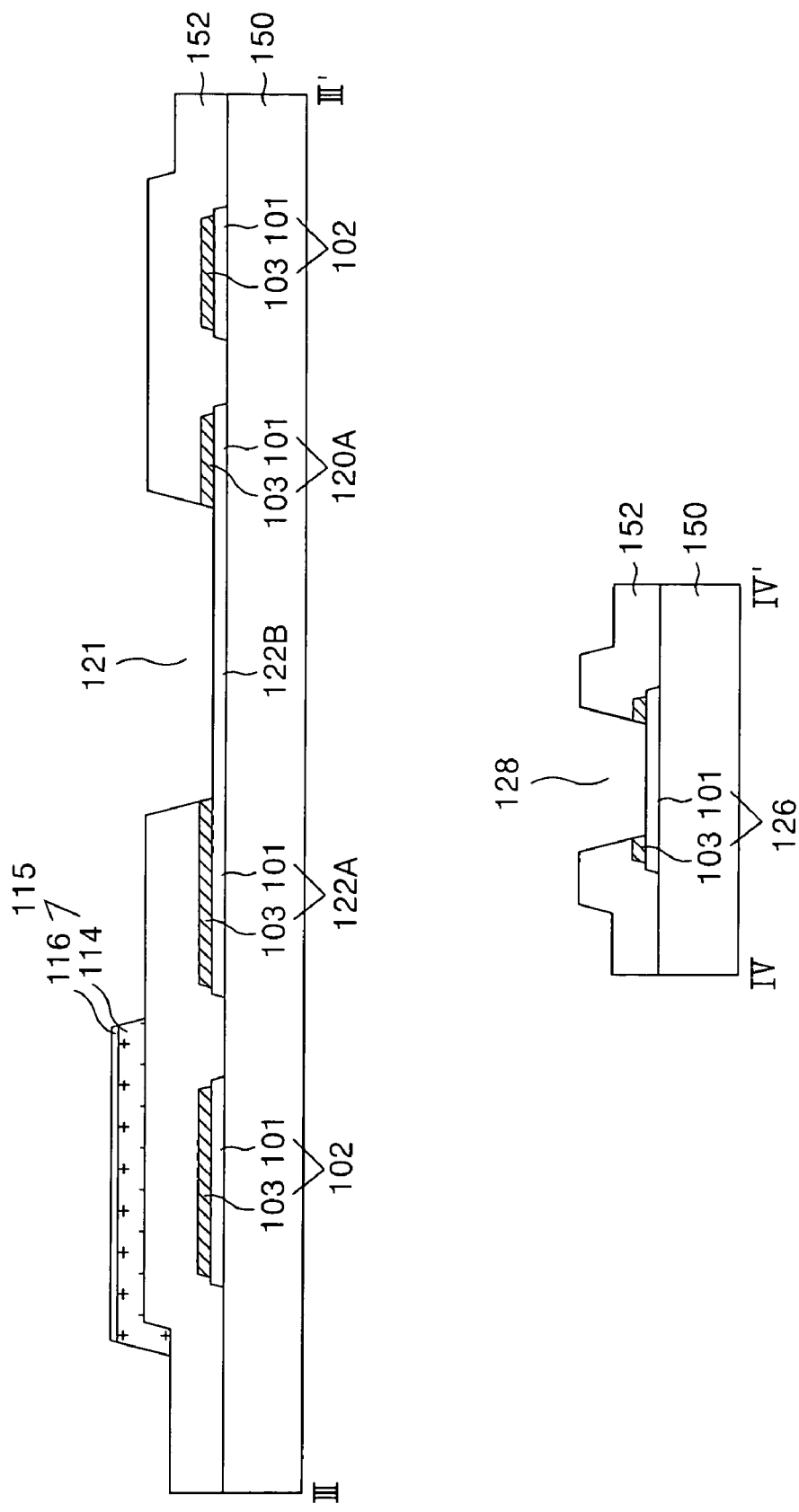

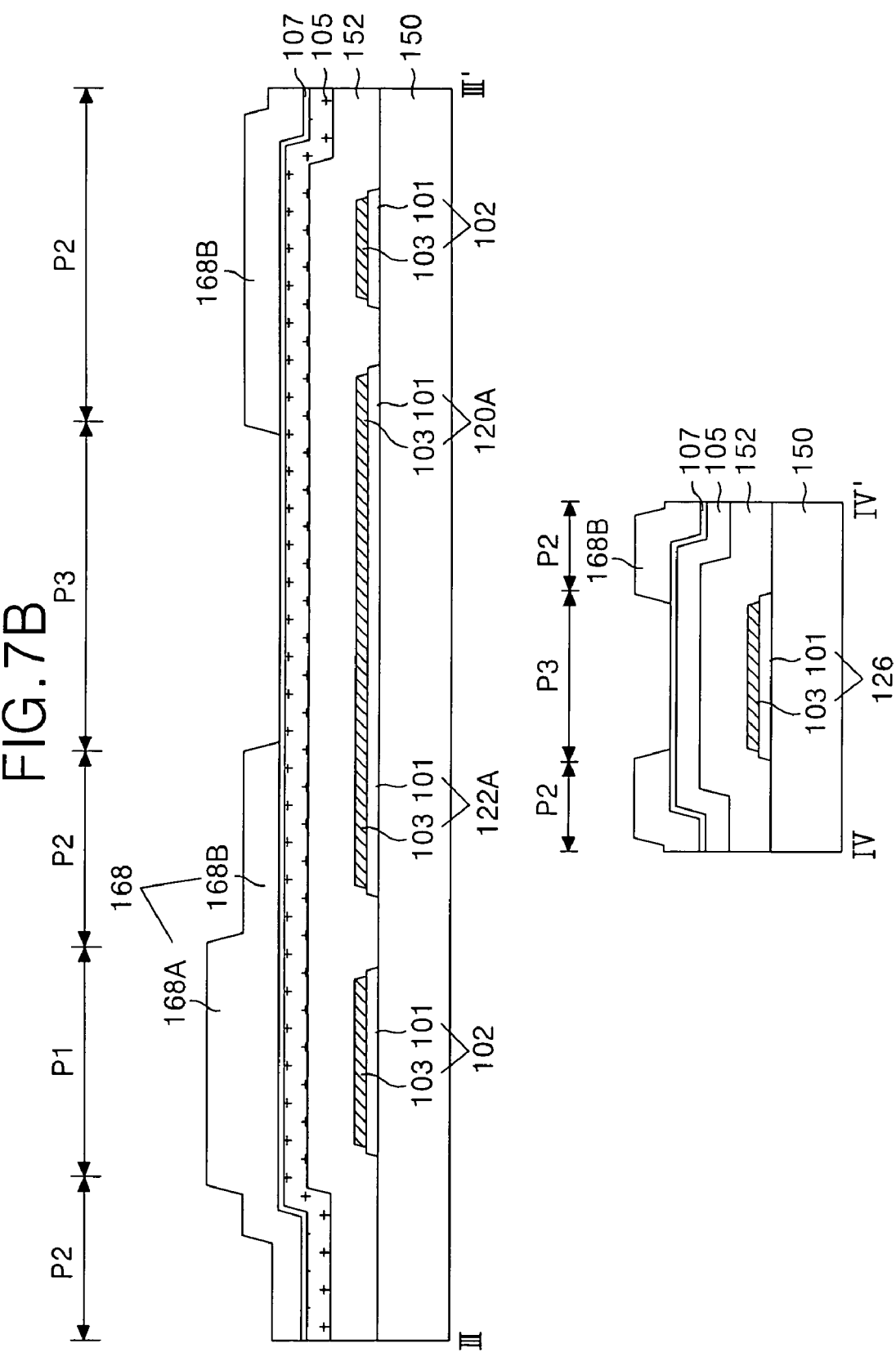

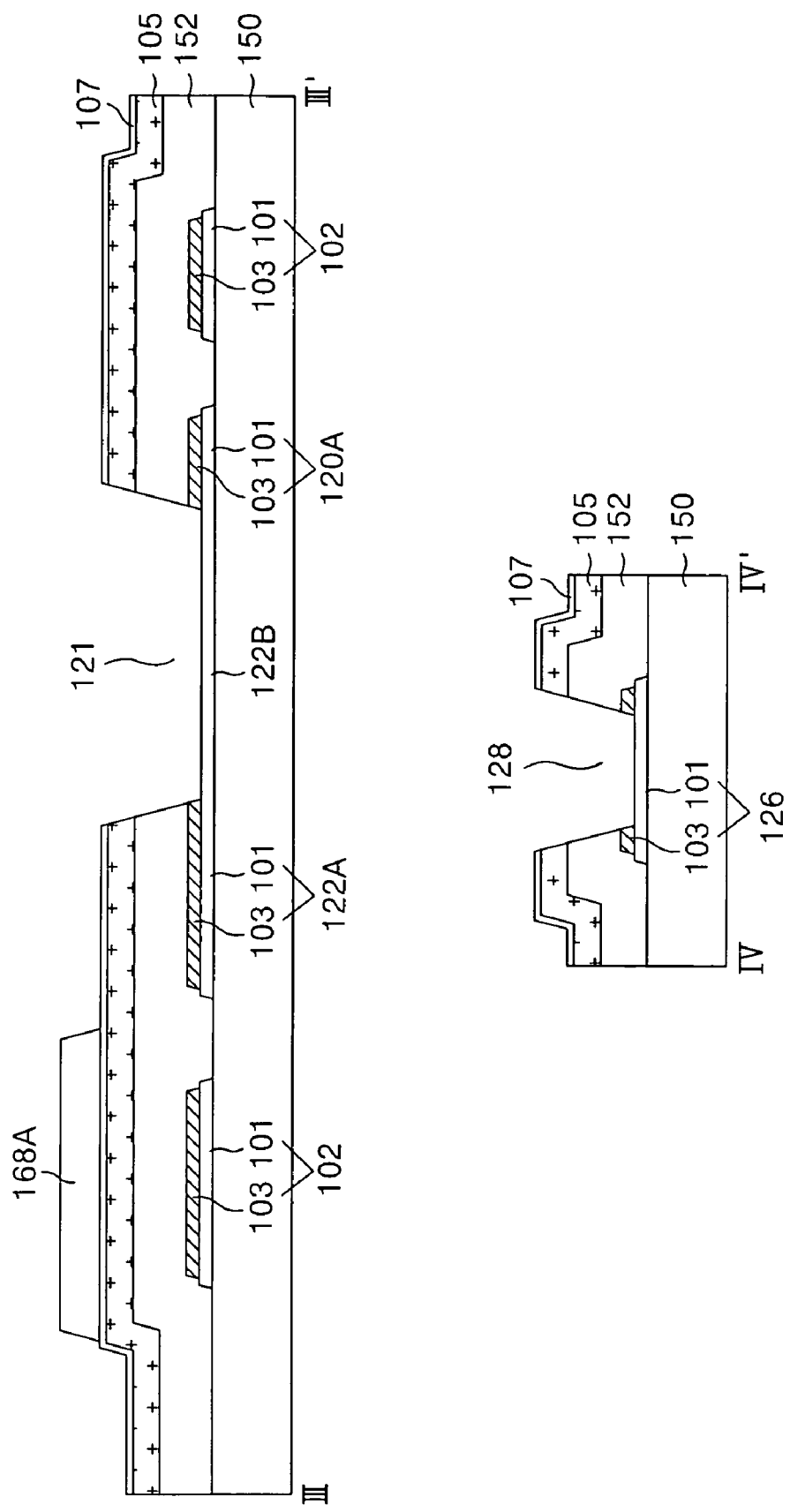

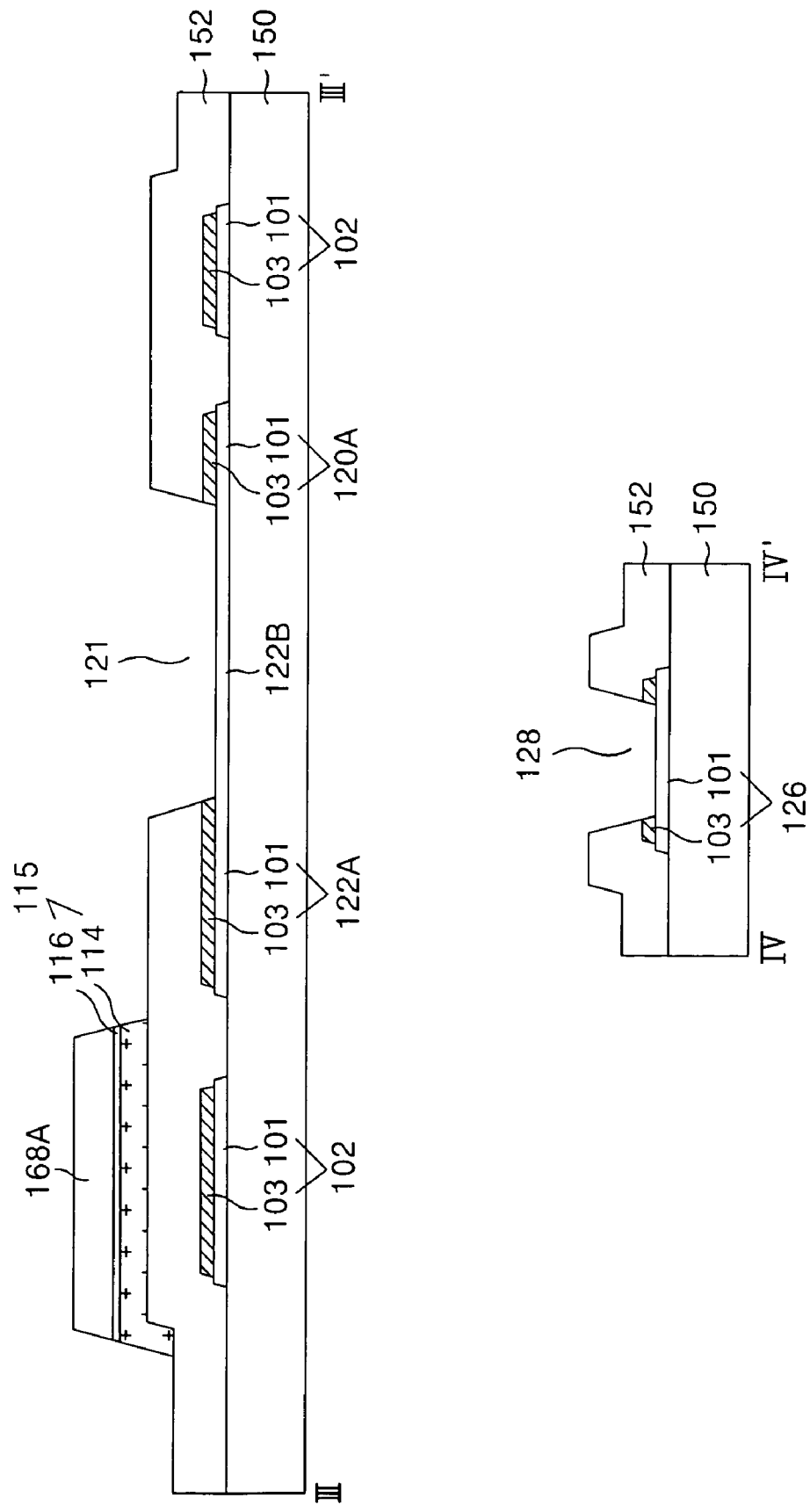

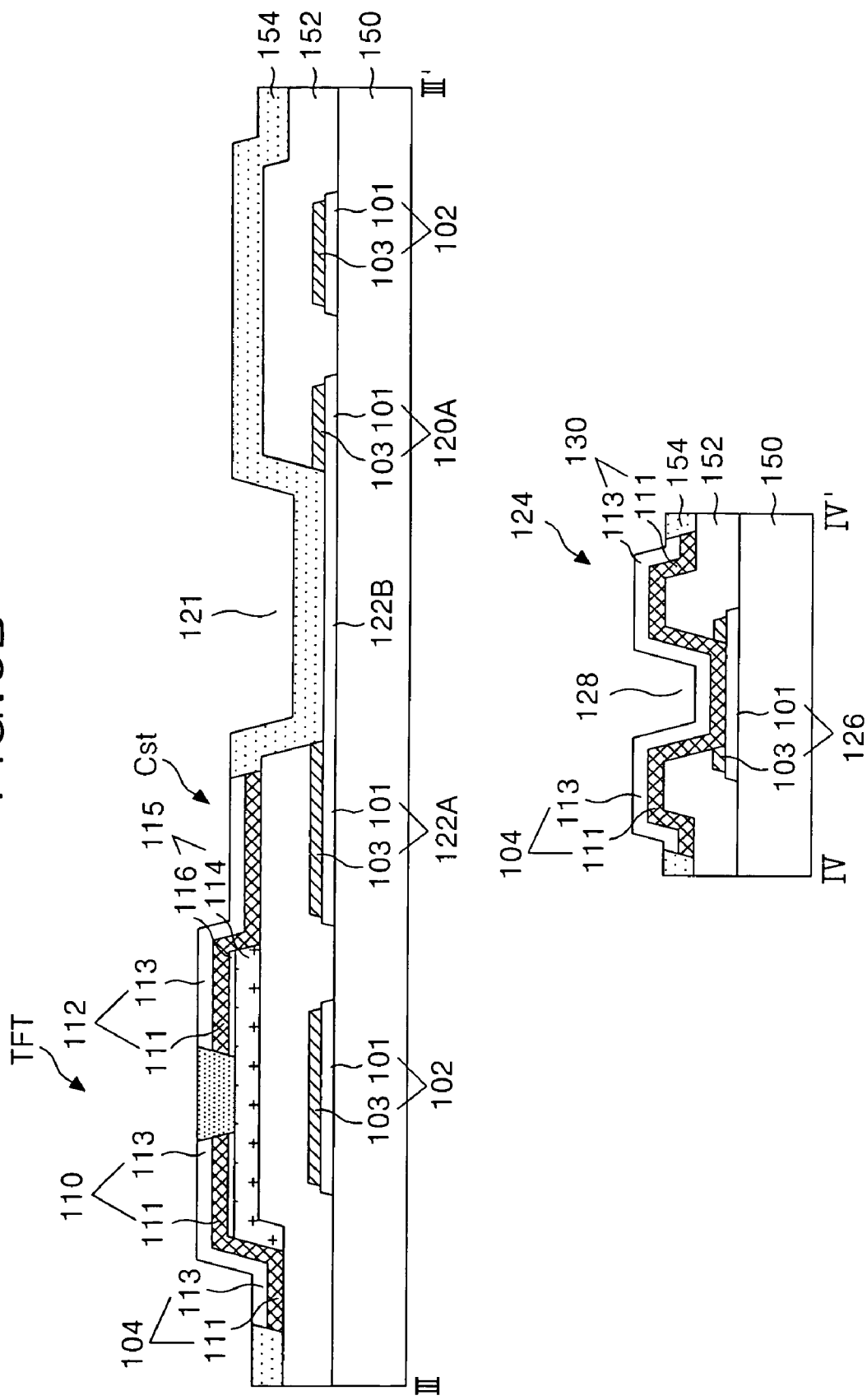

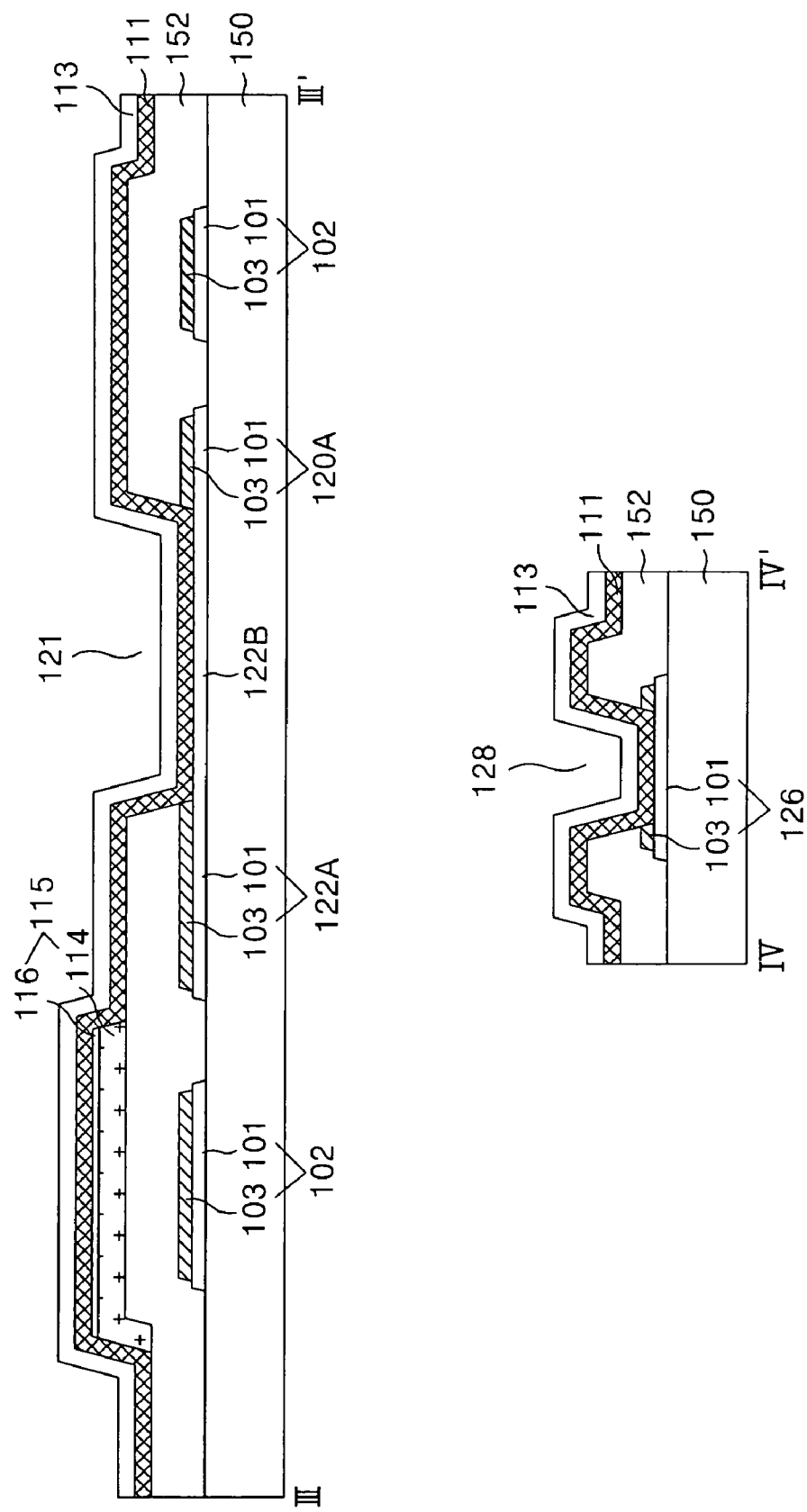

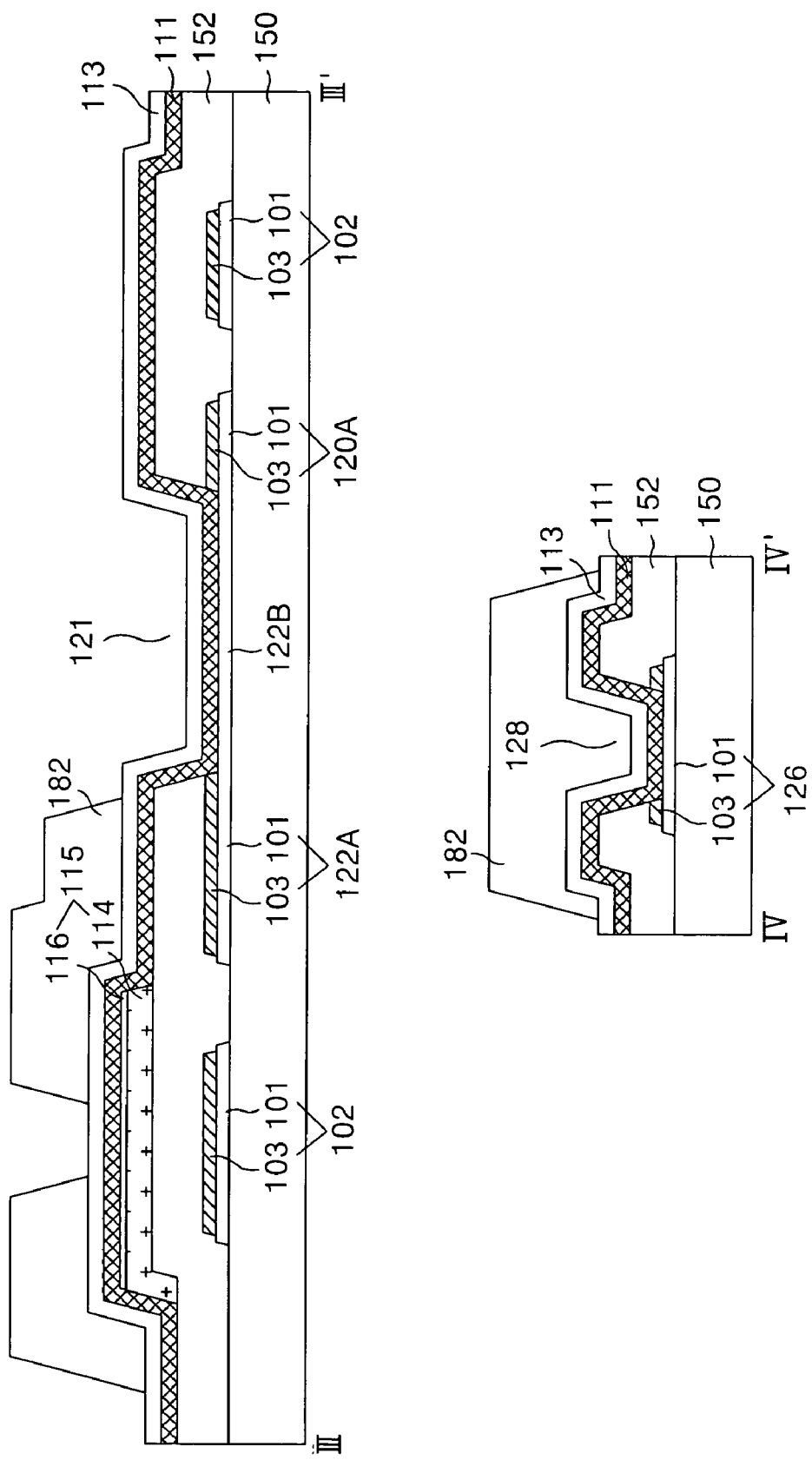

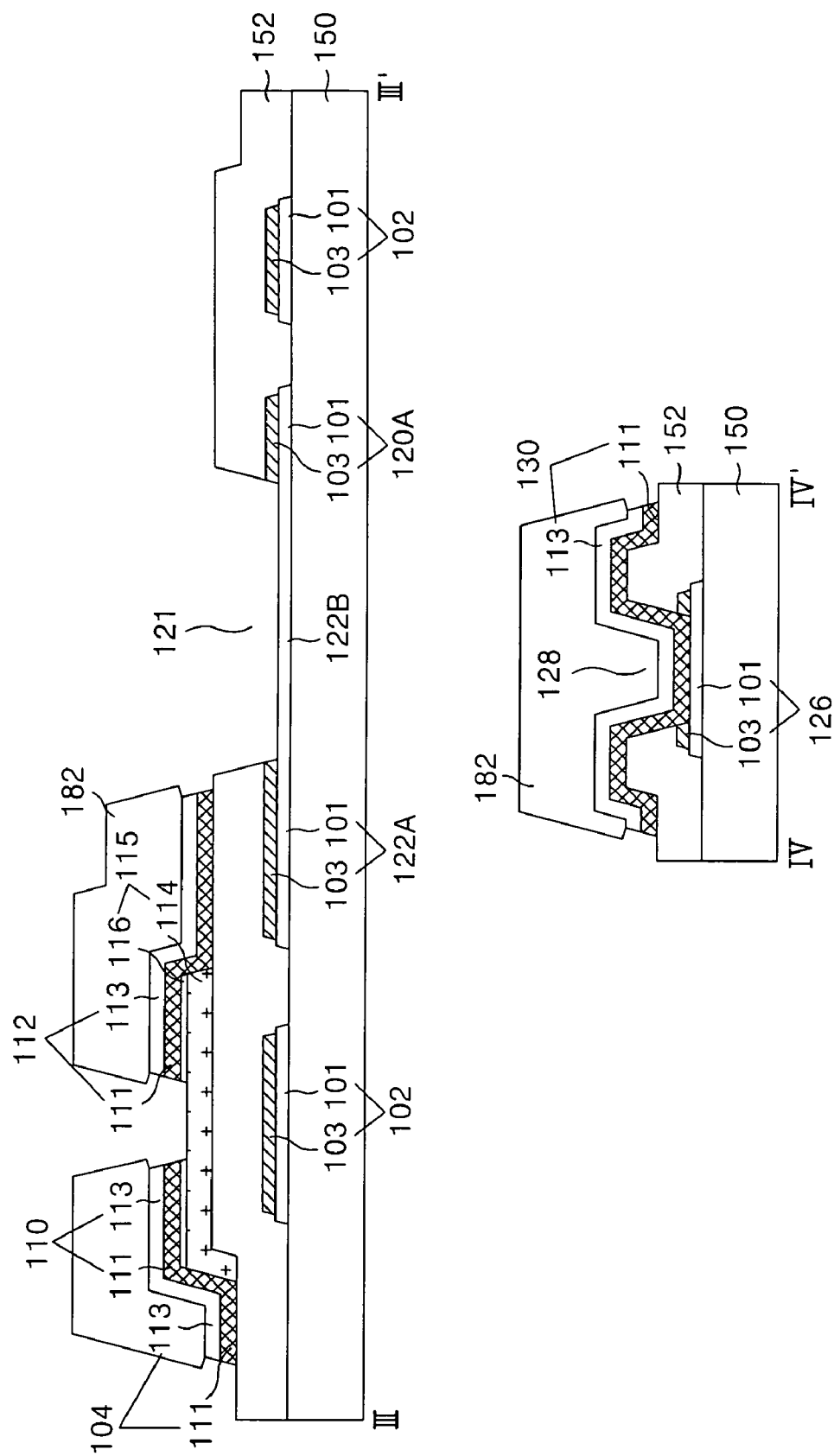

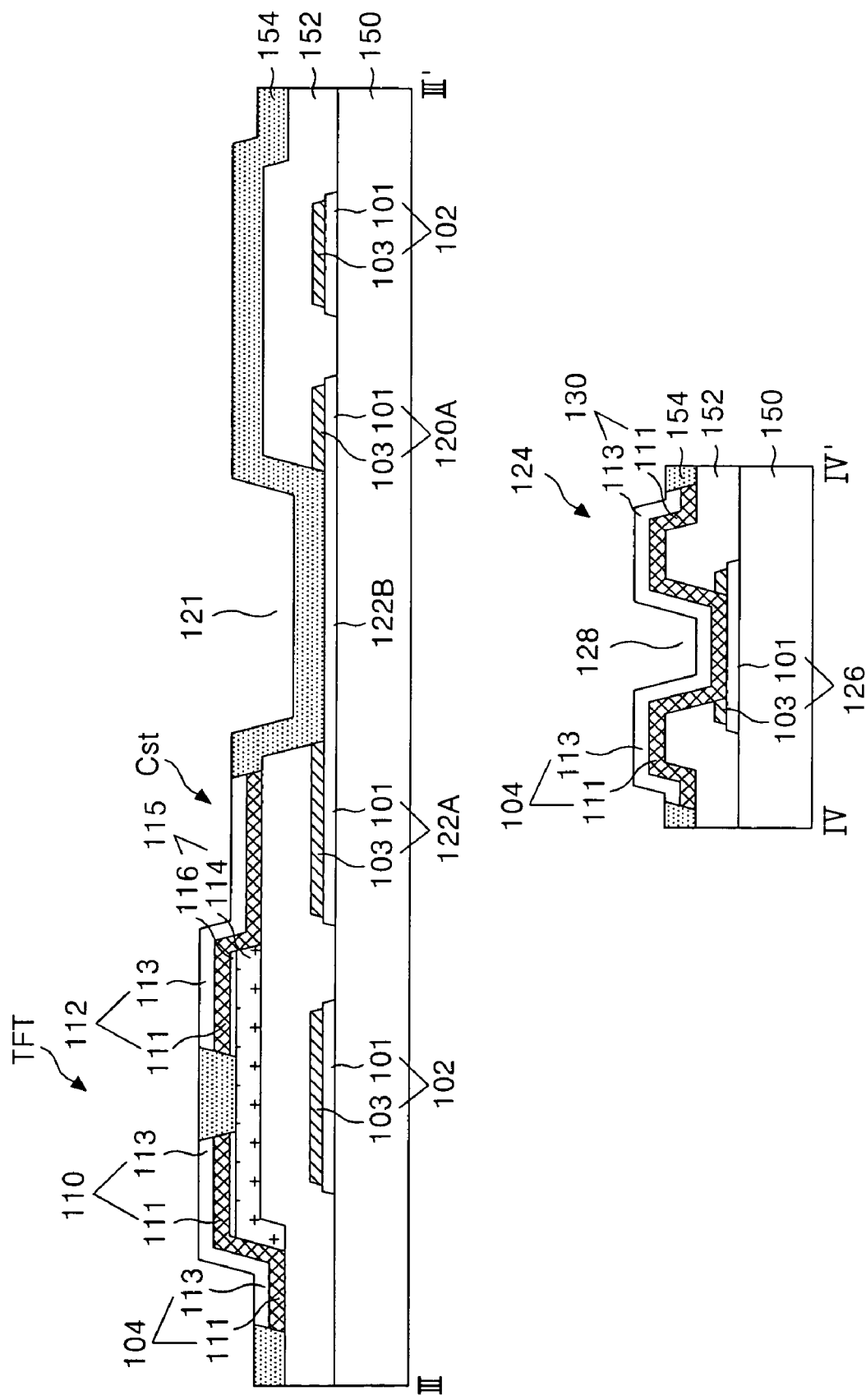

LIQUID CRYSTAL DISPLAY DEVICE WITH A PROTECTIVE FILM PATTERNED BY A LIFT-OFF PROCESS AND FABRICATING METHOD THEREOF

This application claims the benefit of Korean Patent Application No. P2004-112585 filed in Korea on Dec. 24, 2004, which is hereby incorporated by reference for all purposes as if fully set forth herein.

BACKGROUND OF THE INVENTION

1. Field of the Invention

This invention relates to a liquid crystal display device using a horizontal electric field, and more particularly to a thin film transistor substrate of a horizontal electric field applying type and a fabricating method thereof that are adaptive for simplifying a process.

2. Discussion of the Related Art

Generally, a liquid crystal display device controls light transmittance of a liquid crystal having a dielectric anisotropy using an electric field to thereby display a picture. To this end, a liquid crystal display device includes a liquid crystal display panel (hereinafter, a liquid crystal panel) for displaying a picture by a liquid crystal cell matrix, and a driving circuit for driving the liquid crystal display panel.

In FIG. 1, a related art liquid crystal display panel is comprised of a color filter substrate 10 and a thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell area divided by the black matrix 4 in such a manner to be divided into red(R), green(G) and blue(B) areas. Thus, transmitting red, green and blue lights. The common electrode 8 is formed of a transparent conductive layer entirely coated on the color filter 6, and supplies a common voltage Vcom that serves as a reference voltage upon driving of the liquid crystal 24. Further, an over-coated layer (not shown) for smoothing the color filter 6 may be provided between the color filter 6 and the common electrode 8.

The thin film transistor substrate 20 includes a thin film transistor 18 and a pixel electrode 22 provided for each cell area defined by a crossing between a gate line 14 and a data line 16 at a lower glass substrate 12. The thin film transistor 18 applies a data signal from the data line 16 to the pixel electrode 22 in response to a gate signal from the gate line 14. The pixel electrode 22, formed of a transparent conductive layer, supplies a data signal from the thin film transistor 18 to drive the liquid crystal 24.

The liquid crystal 24, having a dielectric anisotropy, is rotated in accordance with an electric field formed by a data signal from the pixel electrode 22 and a common voltage Vcom from the common electrode 8 to control light transmittance, thereby implementing a gray scale level.

Further, a liquid crystal display panel includes a spacer (not shown) for maintaining a cell gap between the color filter substrate 10 and the thin film transistor substrate 20. The spacer may be, for example, a ball spacer or a column spacer.

In the liquid crystal display panel, the color filter substrate 10 and the thin film transistor substrate 20 are formed by a plurality of mask processes. Herein, one mask process includes many processes such as thin film deposition (coating), cleaning, photolithography (hereinafter, photo process), etching, photo-resist stripping and inspection processes, etc.

Particularly, because the thin film transistor substrate includes the semiconductor process and requires a plurality of mask processes, it has a complicated fabricating process which serves as a major factor in increasing manufacturing costs of the liquid crystal display panel. Therefore, the thin film transistor substrate has been developed toward a reduction in the number of mask process.

Liquid crystal displays are largely classified into a vertical electric field applying type and a horizontal electric field applying type based upon a direction of the electric field driving the liquid crystal.

The liquid crystal display of a vertical electric field applying type drives a liquid crystal in a twisted nematic (TN) mode with a vertical electric field formed between a pixel electrode and a common electrode arranged opposite to each other on the upper and lower substrate. The liquid crystal display of vertical electric field applying type has an advantage of a large aperture ratio, while having a drawback of a narrow viewing angle of about 90°.

The liquid crystal display of horizontal electric field applying type drives a liquid crystal in an in-plane switching (IPS) mode with a horizontal electric field between the pixel electrode and the common electrode arranged in parallel to each other on the lower substrate. The liquid crystal display of horizontal electric field applying type has an advantage of a wide viewing angle of about 160°.

The thin film transistor substrate in the liquid crystal display of horizontal electric field applying type also requires a plurality of mask process which is a drawback and complicates the fabricating process. Therefore, in order to reduce the manufacturing cost, it is necessary to reduce the number of mask processes.

SUMMARY OF THE INVENTION

Accordingly, the present invention is directed to a liquid crystal display device and fabricating method thereof that substantially obviate one or more problems due to limitations and disadvantages of the related art.

An advantage of the present invention to provide a thin film transistor substrate of a horizontal electric field applying type and a fabricating method thereof that are adaptive for simplifying a process.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described the liquid crystal display device according to one embodiment of the present invention comprises a gate line on a substrate; a data line crossing the gate line with a gate insulating film therebetween, wherein the crossing gate and data line to define a pixel area; a thin film transistor including a gate electrode connected to the gate line, a source electrode connected to the data line, a drain electrode opposite the source electrode and a semiconductor pattern defining a channel between the source electrode and the drain electrode; a common line on the substrate substantially parallel to the gate line; a common electrode connected to the common line and formed in the pixel area, wherein a pixel electrode connected to the drain electrode and formed in the pixel area, wherein a horizontal electric field is applied between the pixel electrode and the common electrode, wherein the gate line, the common line and the common electrode have a first conductive layer group having at least double conductive layers; the data line, the source electrode, the drain electrode and the pixel electrode have a second conductive layer group of at least double conductive layers; and a protective film interfacing with a second transparent conductive layer group and provided in a remaining area thereof.

In another aspect of the present invention, a method of fabricating a liquid crystal display device comprising a first mask process of forming a first mask pattern group including a gate line, a gate electrode connected to the gate line and a common line substantially parallel to the gate line, wherein the first mask pattern group has a first conductive layer group structure in which at least double conductive layers are built, and a common electrode connected to the common line on a substrate; a second mask process of forming a gate insulating film on the first mask pattern group and a semiconductor pattern at the gate insulating film; and a third mask process of forming a third mask pattern group including a data line, a source electrode connected to the data line and a drain electrode opposite the source electrode that have a second conductive layer group structure of at least double conductive layers, and a pixel electrode connected to the drain electrode on the gate insulating film provided with the semiconductor pattern, and a protective film interfacing with the third mask pattern group on the gate insulating film provided with the semiconductor pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5a and FIG. 5b are a plan view and a sectional view explaining a first mask process in a method of fabricating the thin film transistor substrate of horizontal electric field applying type according to an embodiment of the present invention, respectively;

FIG. 6a and FIG. 6b are a plan view and a sectional view explaining a second mask process in a method of fabricating the thin film transistor substrate of a horizontal electric field applying type according to an embodiment of the present invention, respectively;

FIG. 7a to FIG. 7f are sectional views specifically explaining the second mask process;

FIG. 8a and FIG. 8b are a plan view and a sectional view explaining a third mask process in a method of fabricating the thin film transistor substrate of a horizontal electric field applying type according to an embodiment of the present invention, respectively;

FIG. 9a to FIG. 9e are section views specifically explaining the third mask process;

DETAILED DESCRIPTION OF THE ILLUSTRATED EMBODIMENTS

Reference will now be made to embodiments of the present invention, examples of which are illustrated in the accompanying drawings.

Figure 1:
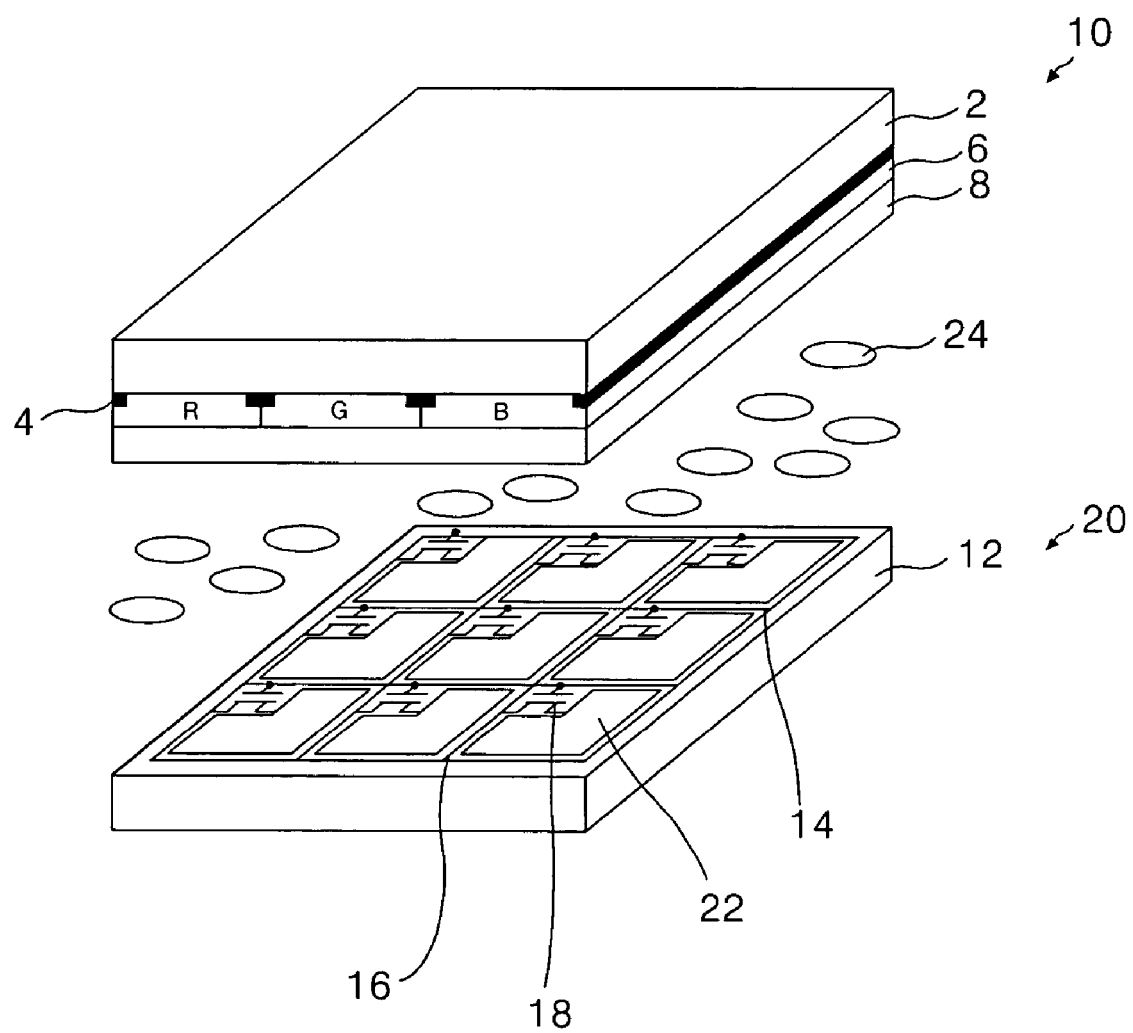
FIG. 1 is a schematic perspective view showing a structure of a related art liquid crystal display panel.
Figure 2:
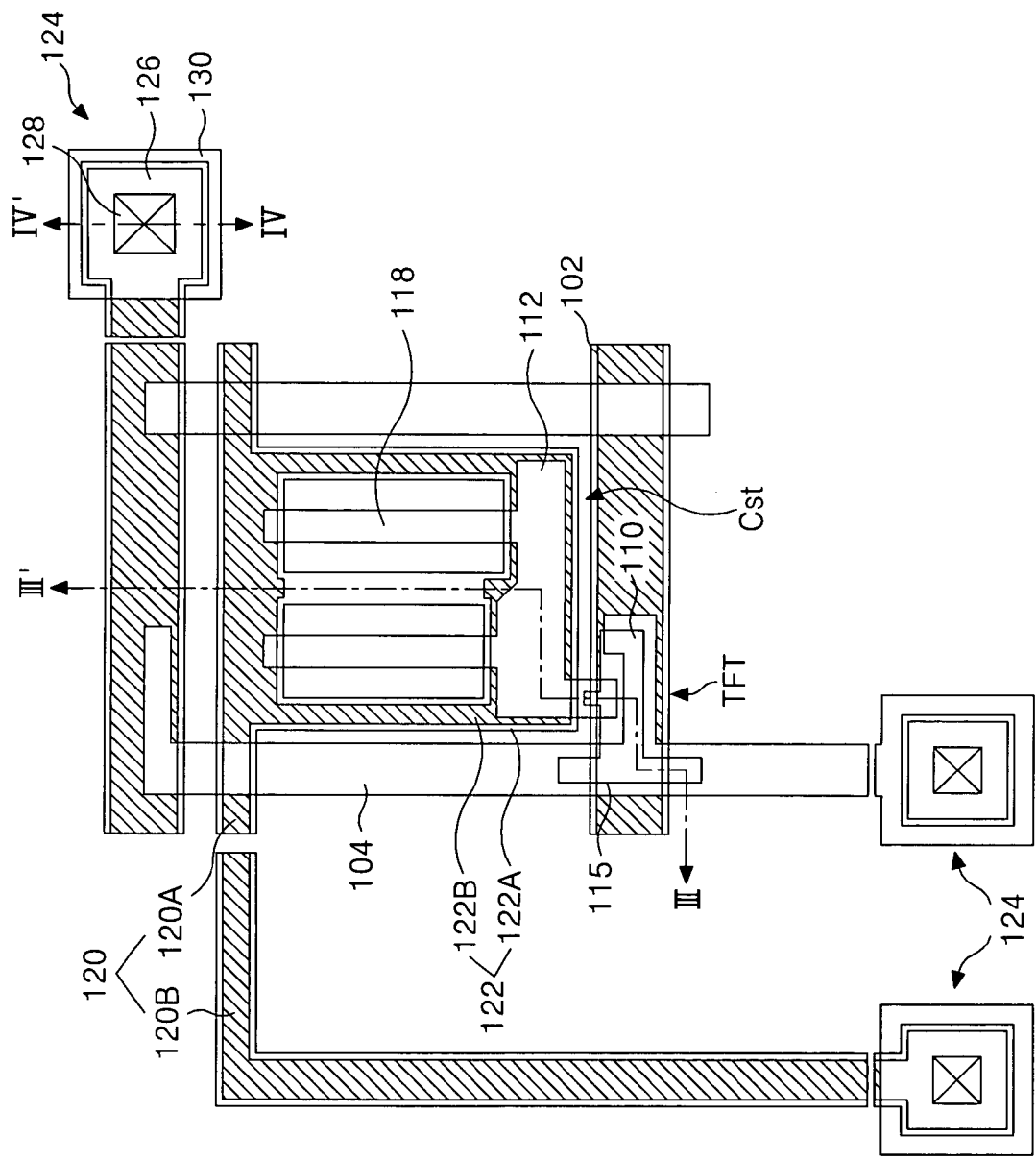
FIG. 2 is a plan view showing a portion of a thin film transistor substrate of a horizontal electric field applying type according to an embodiment of the present invention.
Figure 3:
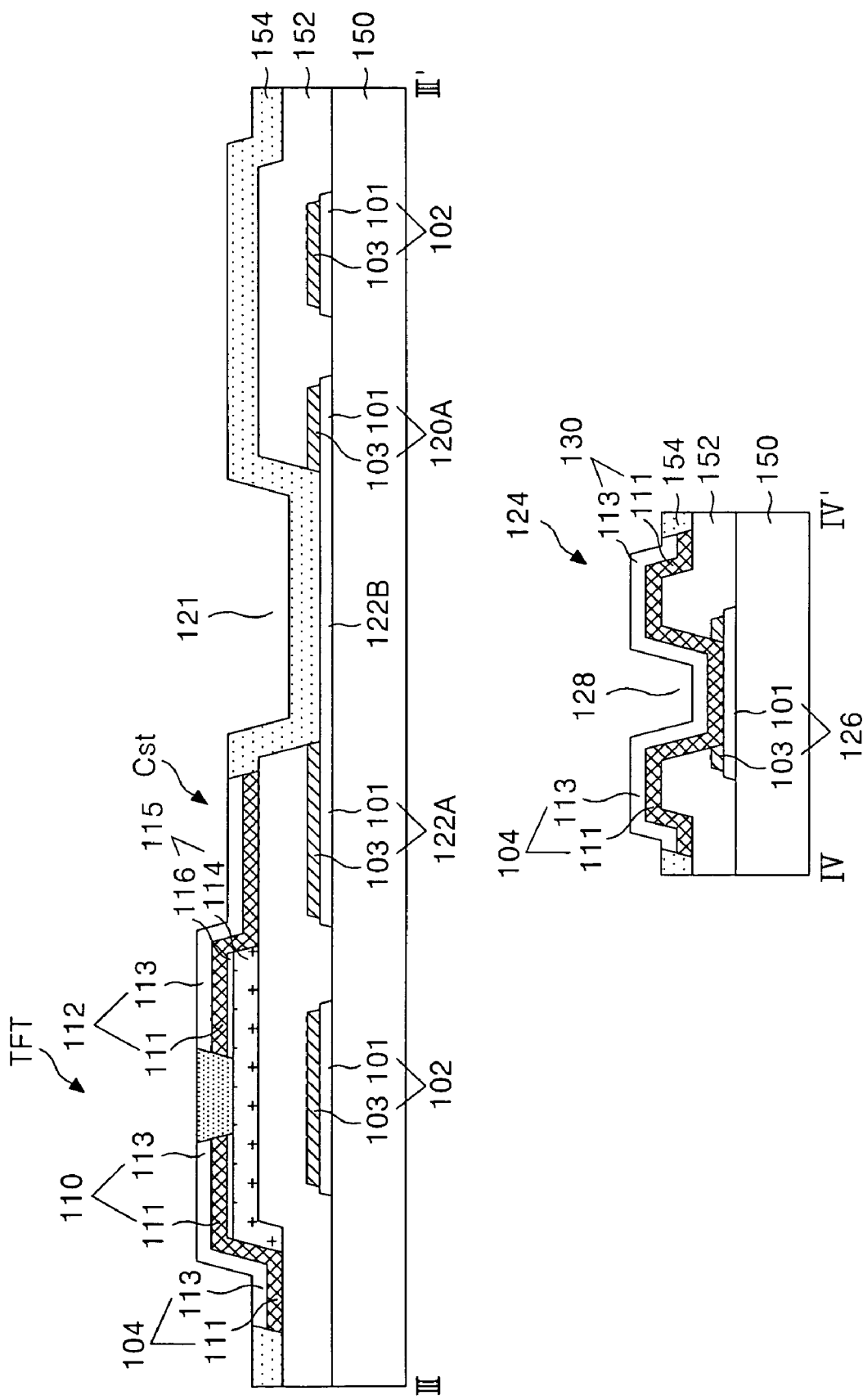
FIG. 3 is a sectional view of the thin film transistor substrate of a horizontal electric field applying type taken along the III-III', IV-IV' and V-V' lines in FIG. 2.

FIG. 2 is a plan view showing a structure of a thin film transistor substrate of a horizontal electric field applying type according to an embodiment of the present invention, and FIG. 3 is a sectional view of the thin film transistor substrate taken along the III-III', and IV-VI' and in FIG. 2.

Referring to FIG. 2 and FIG. 3, the thin film transistor substrate of a horizontal electric field applying type includes a gate line 102 and a data line 104 provided on a lower substrate 150 in such a manner as to cross each other with a gate insulating film 152 therebetween and defining a pixel area, a thin film transistor TFT connected to the gate line 102, the data line 104, and a pixel electrode 118, the pixel electrode 118 and a common electrode 122 provided to form a horizontal electric field in the pixel area, a common line 120 connected to the common electrode 122, and a storage capacitor Cst provided at an overlapping portion between the common electrode 122 and a drain electrode 112. Further, the thin film transistor substrate includes pads 140 connected to each of the gate line 102, the data line 104 and the common line 120.

The gate line 102 supplies a scanning signal from a gate driver (not shown), while the data line 104 supplies a video signal from a data driver (not shown). The gate line 102 and the data line 104 cross each other with the gate insulating film 152 therebetween to define the pixel area.

The gate line 102 is formed on the substrate 150 in a multiple-layer structure having at least double gate metal layers. For instance, as shown FIG. 3, the data line 104 has a double-layer structure in which a first conductive layer 101 having a transparent conductive layer and a second conductive layer 103 formed of an opaque metal. The data line 104 is formed on the gate insulating film 152 in a multiple-layer structure having at least double gate metal layers. For instance, as shown FIG. 3, the gate line 102 has a double-layer structure in which a third conductive layer 111 having an opaque metal and a fourth conductive layer 113 having a transparent conductive layer are formed. The first and fourth conductive layer 101 and 113 are formed of ITO, TO, IZO or ITZO. While the second and third conductive layer 103 and 111 employ a single layer or a multiple-layer structure formed of Mo, Ti, Cu, AlNd, Al, Cr, a Mo-alloy, a Cu-alloy and a Al-alloy, etc.

The thin film transistor TFT allows a video signal applied to the data line 104 to be charged to the pixel electrode 118 and maintained in response to a scanning signal applied to the gate line 102. To this end, the thin film transistor TFT includes a gate electrode extended from the gate line 102, a source electrode 110 connected to the data line 104, a drain electrode 112 positioned opposite to the source electrode 110 to be connected to the pixel electrode 118, a semiconductor pattern 115 overlapping the gate line 102 with the gate insulating film 152 therebetween to provide a channel between the source electrode 110 and the drain electrode 112. Herein, the source electrode 110 and the drain electrode 112, along with the data line 104, have a double-layer structure in which the third conductive layer and fourth conductive layers 111 and 113 are built. The semiconductor pattern 115 includes an active layer 114 defining a channel between the source electrode 110 and the drain electrode 112, and an ohmic contact layer 116 formed on the active layer 114 in an area other than the channel portion to make an ohmic contact with the source electrode 110 and the drain electrode 112.

The common line 120 and the common electrode 122 supply a reference voltage for driving the liquid crystal, that is, a common voltage to each pixel.

To this end, the common line 120 includes an internal common line 120A provided in parallel to the gate line 102 at a display area, and an external common line 120B commonly connected to the internal common line 120A at a non-display area. The common line 120 has a double-layer structure in which the first conductive layer and second conductive layer 101 and 103 are built on the substrate 150 along with the above-mentioned gate line 102.

The common electrode 122 is provided within the pixel area and connected to the internal common line 120A. More specifically, the common electrode 122 includes a horizontal part 122A overlapping with the drain electrode 112 adjacent the gate line 102, and a finger part 122B extended from the horizontal part 122A into the pixel area and connected to the internal common line 120A. The horizontal part 122A of the common electrode 122 and the finger part 122B other than a middle finger have a double-layer structure in which the first and second conductive layers 101 and 103 are formed similar to the common line 120. The middle finger is formed only of the first conductive layer 101 of the common line 120, that is, a transparent conductive layer in order to improve an aperture ratio. The second conductive layer 103 is etched by a transmitting hole 121 passing through the gate insulating film 152 to thereby provide the middle finger.

The storage capacitor Cst is provided such that the first horizontal part 122A of the common electrode 122 overlaps the drain electrode 112 with the gate insulating film 152 therebetween. Herein, the drain electrode 112 is extended from the overlapping portion between it and the thin film transistor TFT, that is, the gate line 102 in such a manner to overlap with the first horizontal part 122A of the common electrode 122 as widely as possible. Thus, a capacitance value of the storage capacitor Cst is increased by the wide overlapping area between the common electrode 122 and the drain electrode 112, so that the storage capacitor Cst allows a video signal charged in the pixel electrode 118 to be stably maintained until the next signal is charged.

The pixel electrode 118 is extended from the drain electrode 112 in such a manner to have a finger shape substantially parallel to the finger part 122B of the common electrode 122. The edge of the pixel electrode 118 is overlapped with the internal common line 120A. Particularly, the pixel electrode 118 is formed of the fourth conductive layer 113 extended from the drain electrode 112. That is, a transparent conductive layer. If a video signal is applied, via the thin film transistor, to the pixel electrode 118, then a horizontal electric field is formed between the pixel electrode 118 and the finger part 122B of the common electrode 122 supplied by the common voltage. Liquid crystal molecules arranged in the horizontal direction between the thin film transistor array substrate and the color filter array substrate by such a horizontal electric field are rotated due to a dielectric anisotropy. Transmittance of a light transmitting in the pixel area is differentiated based upon a rotation extent of the liquid crystal molecules, thereby implementing a gray level scale.

Figure 4:
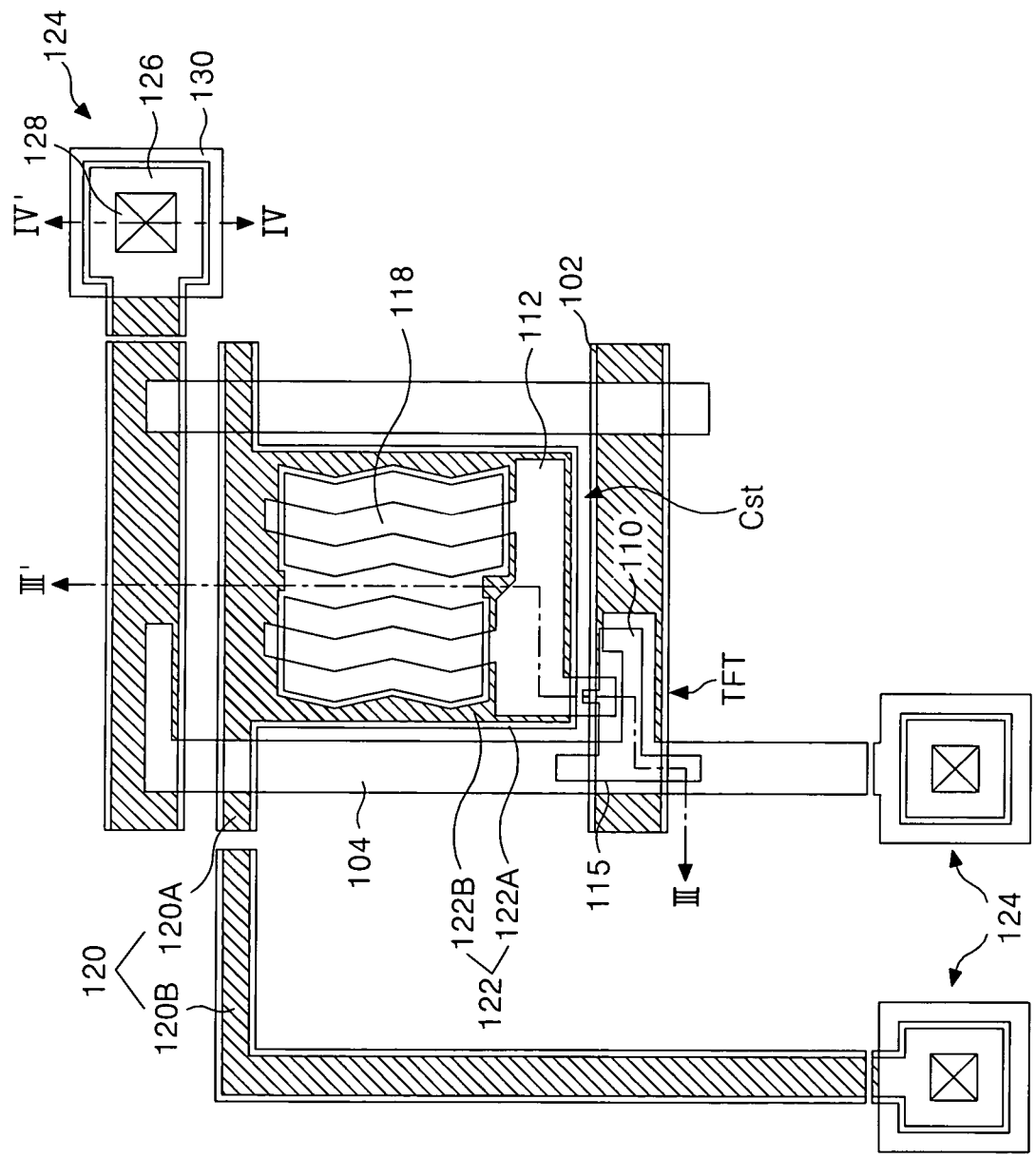
FIG. 4 is a plan view showing a portion of a thin film transistor substrate of horizontal electric field applying type according to the another embodiment of the present invention.

Further, as shown FIG. 4, the finger part 122B of the common electrode 122 and the pixel electrode 118 can be formed in a zigzag shape. In this case, an edge of the finger part 122B of the common electrode 122 adjacent to the data line 104 is formed in such a manner as to be substantially parallel to the data line 104 or in a zigzag shape. Also, the data line 104 may be formed in a zigzag shape along the finger part 122B of the adjacent common electrode 122.

The gate line 102, the data line 104 and the common line 120 receive a corresponding driving signal, via the pad 124 connected to each of them, from the driving circuit. The pads 124 have the same structure. More specifically, the pad 124 includes a lower pad electrode 126 connected to an upper pad electrode 130, via a contact hole 128 passing through the gate insulating film 152. Herein, the lower pad electrode 126 has a double-layer structure in which the first and second conductive layers 101 and 103 are formed similar to the gate line 102 and the common line 120. The contact hole 128 passes through the gate insulating film 152 and the second conductive layer 103 to expose the first conductive layer 101. The upper pad electrode 130 has a double-layer structure in which the third and fourth conductive layers 111 and 113 are formed similar to the data line 104. Thus, each of the gate line 102 and the common line 120 is connected, via the lower pad electrode 126 provided on the substrate 150 in the same structure, to the corresponding pad 124. On the other hand, the data line 104 is connected, via the upper pad electrode 130 provided on the substrate 150 in the same structure, to the corresponding pad 124.

The protective film 154 interfaces with the data line 104, the source electrode 110, the drain electrode 112, the pixel electrode 118 and the upper pad electrode 130 having a double-layer structure in which the third and fourth conductive layers 111 and 113 are built. This is because the protective film 154 is formed in a state in which the photo-resist pattern used upon patterning of the third and fourth conductive layers 111 and 113 is left and then is patterned by lifting-off the photo-resist pattern.

The thin film transistor substrate of a horizontal electric field applying type according to the embodiment of the present invention having no protective film as described above is formed by the following three-round mask process.

Figure 5A:
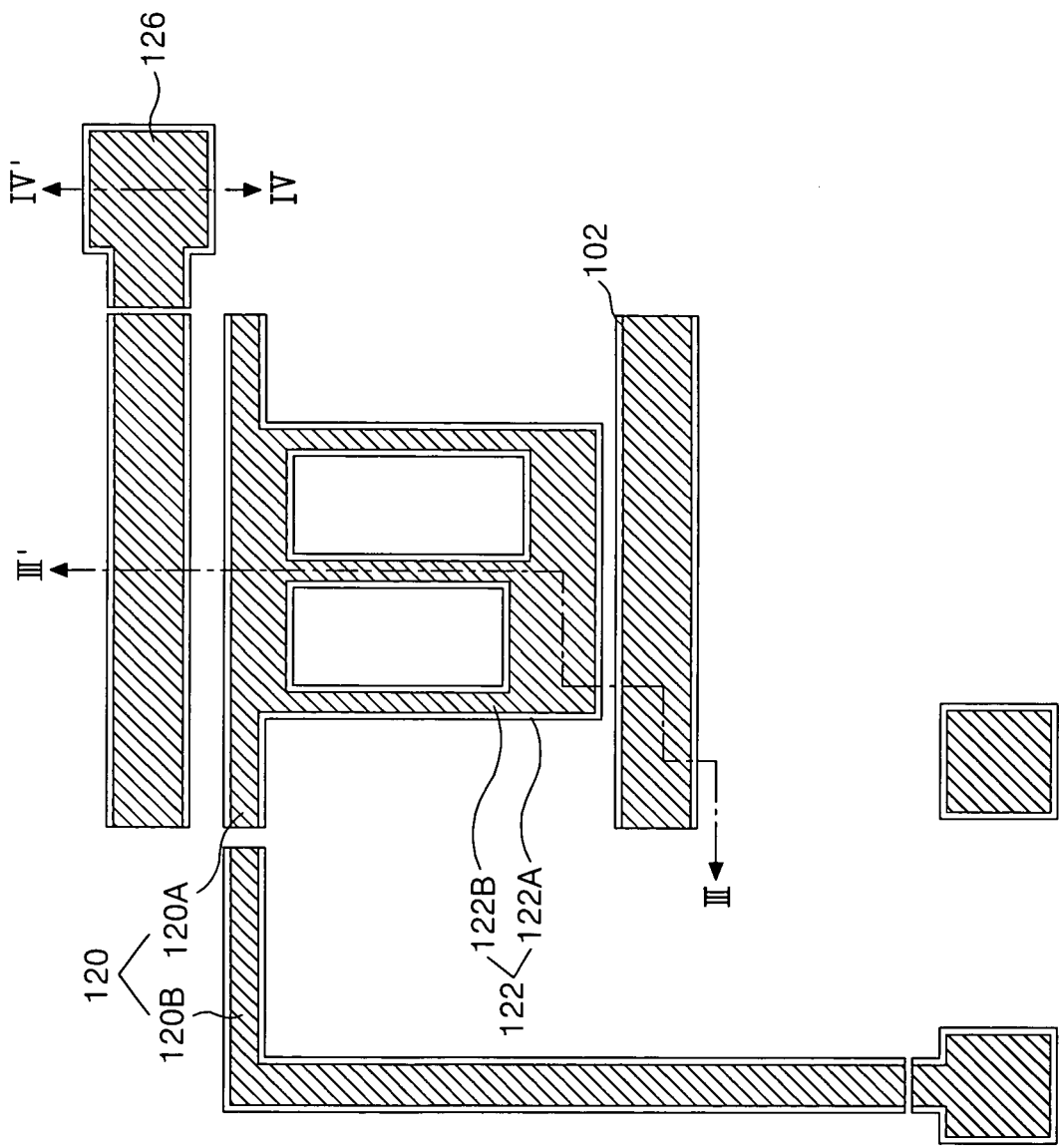

FIG. 5a and FIG. 5b are a plan view and a section view explaining a first mask process, respectively, in a method of fabricating the thin film transistor substrate of a horizontal electric field applying type according to the embodiment of the present invention.

A first mask pattern group including the gate line 102, the lower pad electrode 126, the common line 120 and the common electrode 122 is formed on the lower substrate 150 by the first mask process. Such a first mask pattern group has a multiple-layer structure in which at least two conductive layers are built. For convenience, only a double-layer structure having the first and second conductive layers 101 and 103 built will be explained.

Specifically, the first and second conductive layers 101 and 103 are disposed on the lower substrate 150 by a deposition technique such as the sputtering. The first conductive layer 101 is formed of a transparent conductive material such as ITO, TO, IZO or ITZO. The second conductive layer 103 employs a single layer formed of a metal material such as Mo, Ti, Cu, AlNd, Al, Cr, a Mo-alloy, a Cu-alloy or an Al-alloy or may have a layer built structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy. Next, the first and second conductive layers 101 and 103 are patterned by photolithography and an etching process using the first mask, thereby providing the first mask pattern group including a double-layer structure of the gate line 102, the lower electrode 126, the common line 120, and the common electrode 122.

Figure 6A:
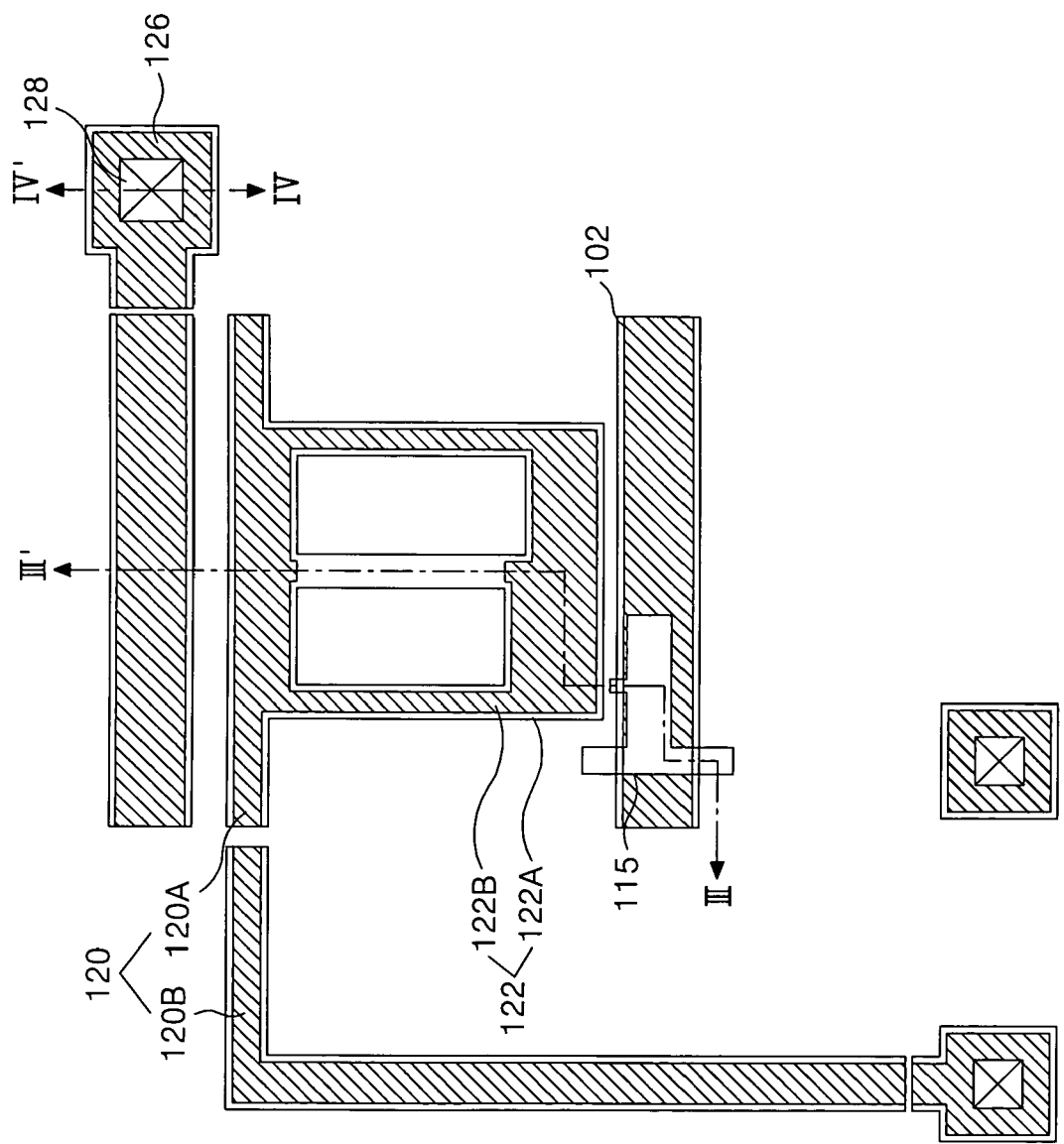

FIG. 6a and FIG. 6b are a plan view and a sectional view explaining a second mask process in a method of fabricating the thin film transistor substrate of a horizontal electric field applying type according to the embodiment of the present invention, respectively, and FIG. 7a to FIG. 7f are section views more specifically explaining the second mask process.

The gate insulating film 152 including a transmitting hole 121 and a contact hole 128, and the semiconductor pattern 115 are formed on the lower substrate 150 provided with the first mask pattern group by the second mask process. The semiconductor pattern 115, and the transmitting hole 121 and the contact hole 128 are defined by a single mask process employing a diffractive exposure mask or a half tone mask. Hereinafter, a case where the half tone mask is used as a second mask will be described.

Figure 7A:
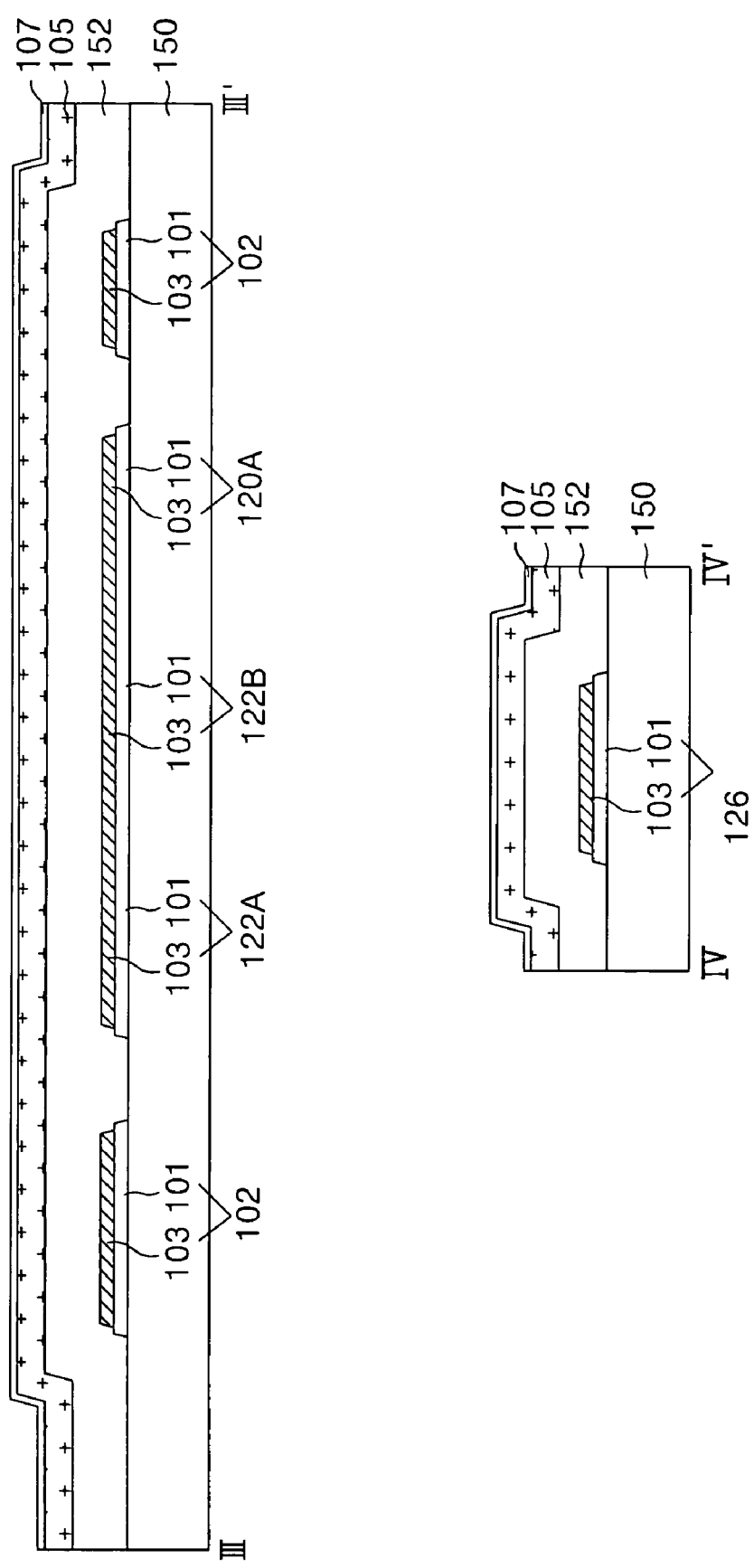

In FIG. 7a, the gate insulating film 152, an amorphous silicon layer 105 and an amorphous silicon layer 107 doped with an $n^+$ or $p^+$ impurity are sequentially disposed on the lower substrate 150 provided with the first mask pattern group by a deposition technique such as the PECVD. Herein, the gate insulating film 152 is formed of an inorganic insulating material such as silicon oxide ($SiO_x$) or silicon nitride ($SiN_x$).

In FIG. 7b, a first photo-resist pattern 168 having step coverage is formed by photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The first photo-resist pattern 168 includes first photo-resist patterns 168A and 168B having a different thickness and an aperture part formed by photolithography using a half tone mask. In this case, the relatively thick first photo-resist pattern 168A is provided at a shielding area P1 of the first photo-resist overlapping with the shielding part of the half tone mask; the first photo-resist pattern 168B is thinner than the first photo-resist pattern 168A and is provided at a half tone exposure area P2 overlapping the half-tone transmitting part; and the aperture part is provided at an full exposure area P3 overlapping the full transmitting part.

Figure 7C:
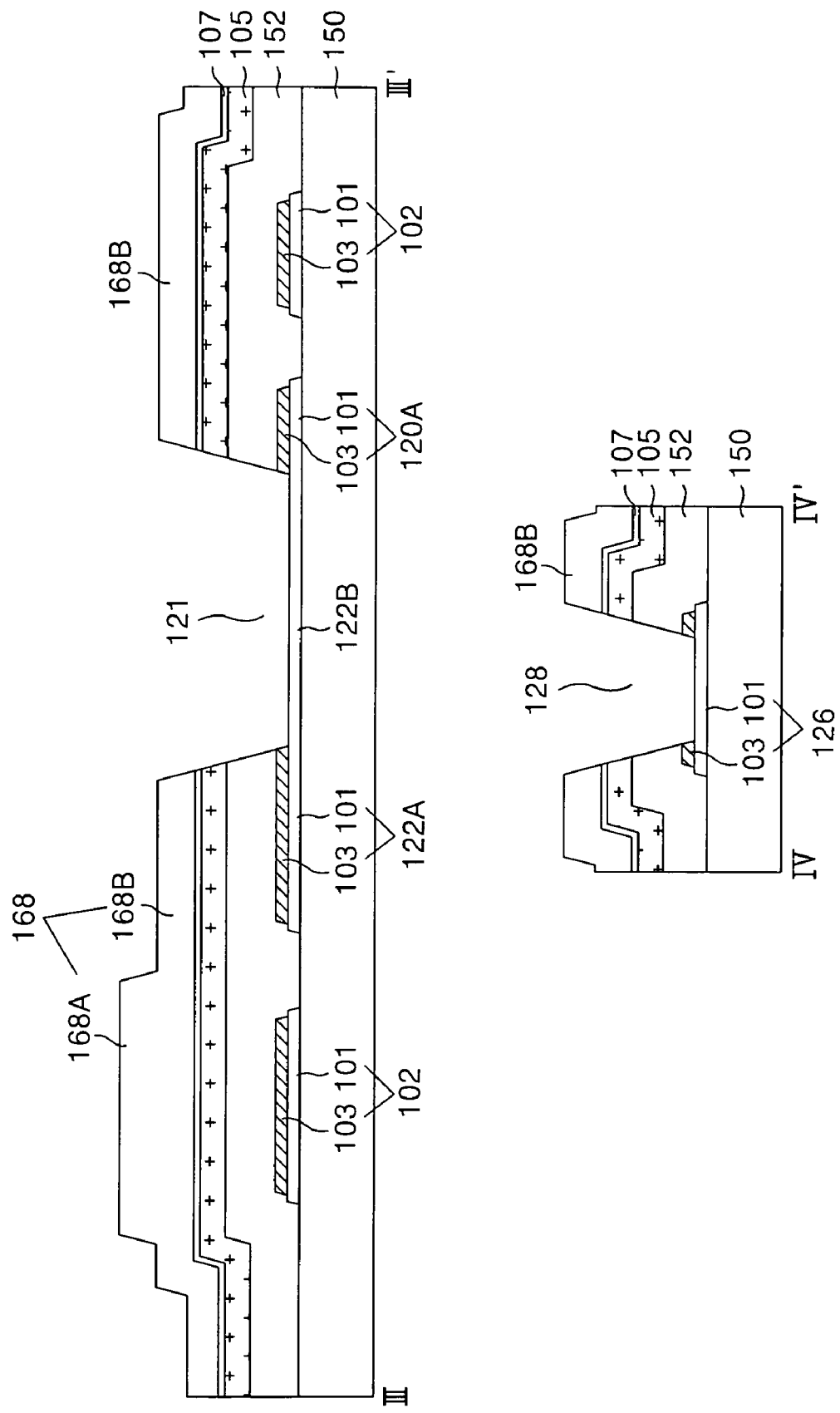

Referring to FIG. 7c, the transmitting hole 121 and the contact hole 128 pass through the second conductive layer 103 from the amorphous silicon layer 107 doped with an $n^+$ or $p^+$ impurity 105 and are formed by the etching process using the first photo-resist pattern 168 as a mask. The transmitting hole 121 and the contact hole 128 expose the middle finger of the finger part 122B of the common electrode 122, and the first conductive layer 101 of the lower pad electrode 126.

Referring to FIG. 7d, a thickness of the first photo-resist pattern 168A is thinned and the first photo-resist pattern 168B is removed by an ashing process using an oxygen ($O_2$) plasma.

In FIG. 7e, the amorphous silicon doped with an n+ or p+ impurity 107 and the amorphous silicon layer 105 are patterned by an etching process using the ashed first photo-resist pattern 168A as a mask to thereby provide the semiconductor pattern 115 including the active layer 114 and the ohmic contact layer 116.

Figure 7F:
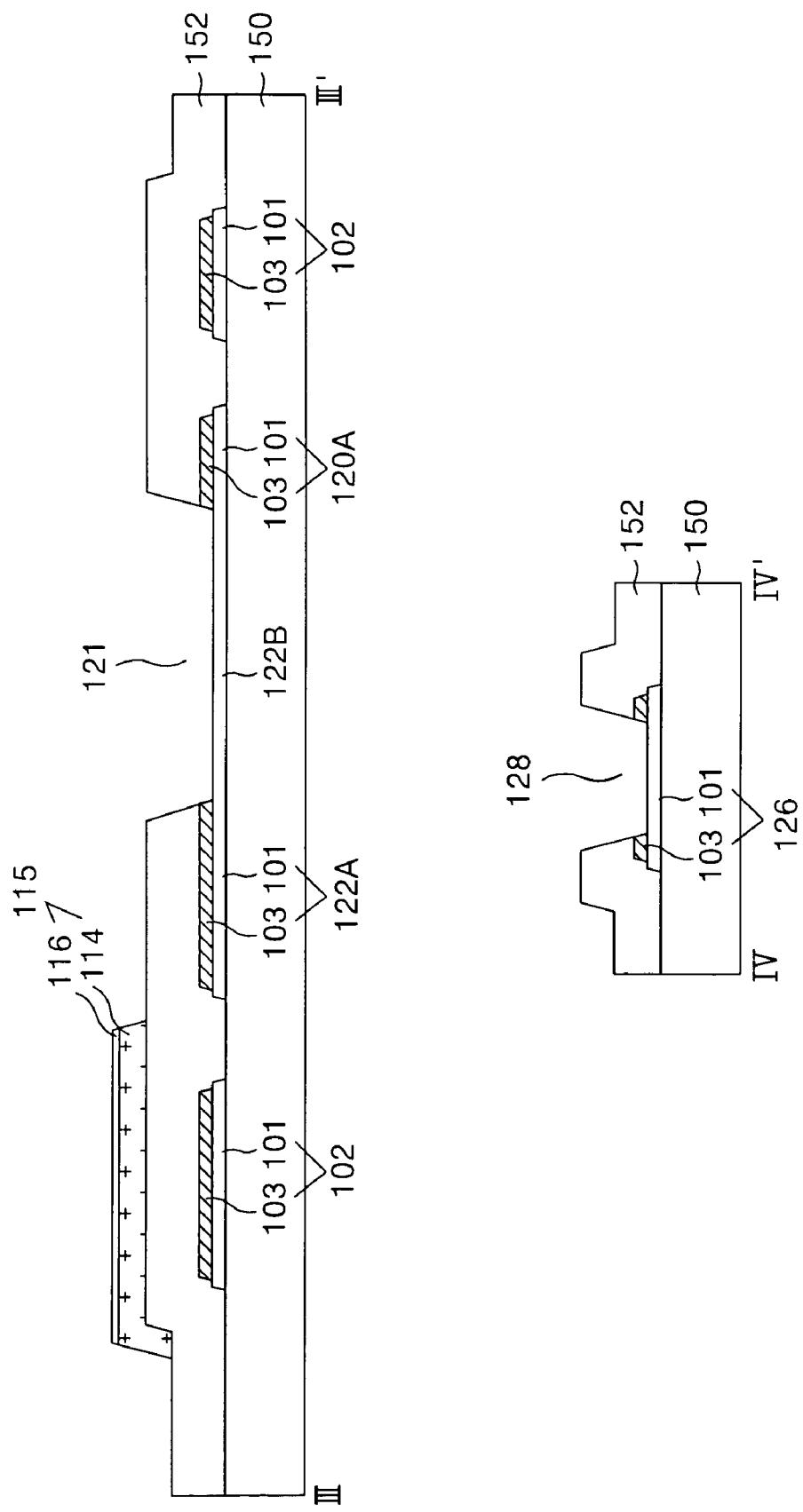

Referring to FIG. 7f, the first photo-resist pattern 168A left on the semiconductor pattern in FIG. 7e is removed by a stripping process.

Otherwise, a process of forming the first and second contact holes 128 and 148 and the semiconductor pattern 115 including the active layer 114 and the ohmic contact layer 116 using the first photo-resist pattern 168 as a mask may be replaced by a single process.

Figure 8A:
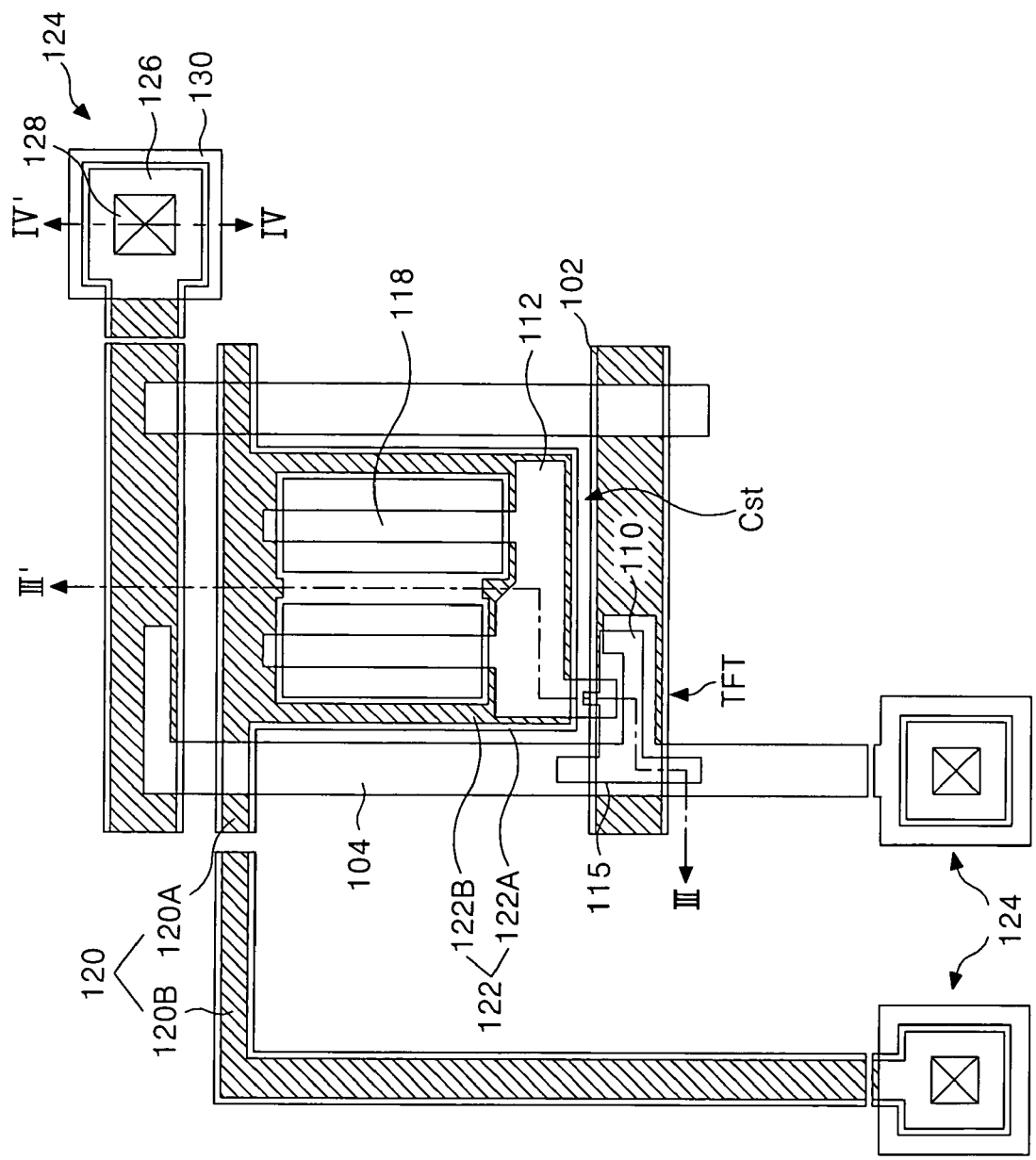

FIG. 8a and FIG. 8b are a plan view and a sectional view explaining a third mask process in a method of fabricating the thin film transistor substrate of a horizontal electric field applying type according to the embodiment of the present invention, respectively, and FIG. 9a to FIG. 9e are sectional views more specifically explaining the third mask process.

A third mask pattern group including the data line 104, the source electrode 110, the drain electrode 112, the pixel electrode 118 and the upper pad electrode 130 is formed on the gate insulating film 152 provided with the semiconductor pattern 115 by the third mask process, and the protective film 154 interfaces with the third mask pattern group. The third mask pattern group has a multiple-layer structure in which at least two conductive layers are formed. For convenience, only a double-layer structure having the third and fourth conductive layers 111 and 113 will be described.

Referring to FIG. 9a, the third and fourth conductive layers 111 and 113 are sequentially formed on the gate insulating film 152 provided with the semiconductor pattern 115 by a deposition technique such as the sputtering. The third conductive layer 111 employs a single layer formed of a metal material such as Mo, Ti, Cu, AlNd, Al, Cr, a Mo-alloy, a Cu-alloy or an Al-alloy, etc., or may have a layered structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, etc. The fourth conductive layer 113 employs a transparent conductive material such as ITO, TO, IZO or ITZO, etc. On the other hand, the fourth conductive layer 113 employs an opaque metal having a strong corrosion resistance and a high strength such as Ti or W, etc.

Referring to FIG. 9b, a photo-resist pattern 182 is formed on the fourth conductive layer 113 by photolithography using a third mask.

In FIG. 9c, the third and fourth conductive layers 111 and 113 are patterned by an etching process using the photo-resist pattern 182 as a mask, for example, a wet-etching process, to thereby provide the third conductive pattern group including a double-layer structure of the data line 104, the source electrode 110, the drain electrode 112, the pixel electrode 118 and the upper pad electrode 130. The third conductive pattern group is over-etched using the photo-resist pattern 182. Further, the ohmic contact layer 116 between the source electrode 110 and the drain electrode 112 is removed by an etching process using the source electrode 110 and the drain electrode 112 as a mask, for example, a dry-etching process, to thereby expose the active layer 114. In this case, the edge of the separated ohmic contact layer 116 has a more protruded shape than the third conductive layer 111 edges of the source electrode 110 and the drain electrode 112.

Figure 9D:
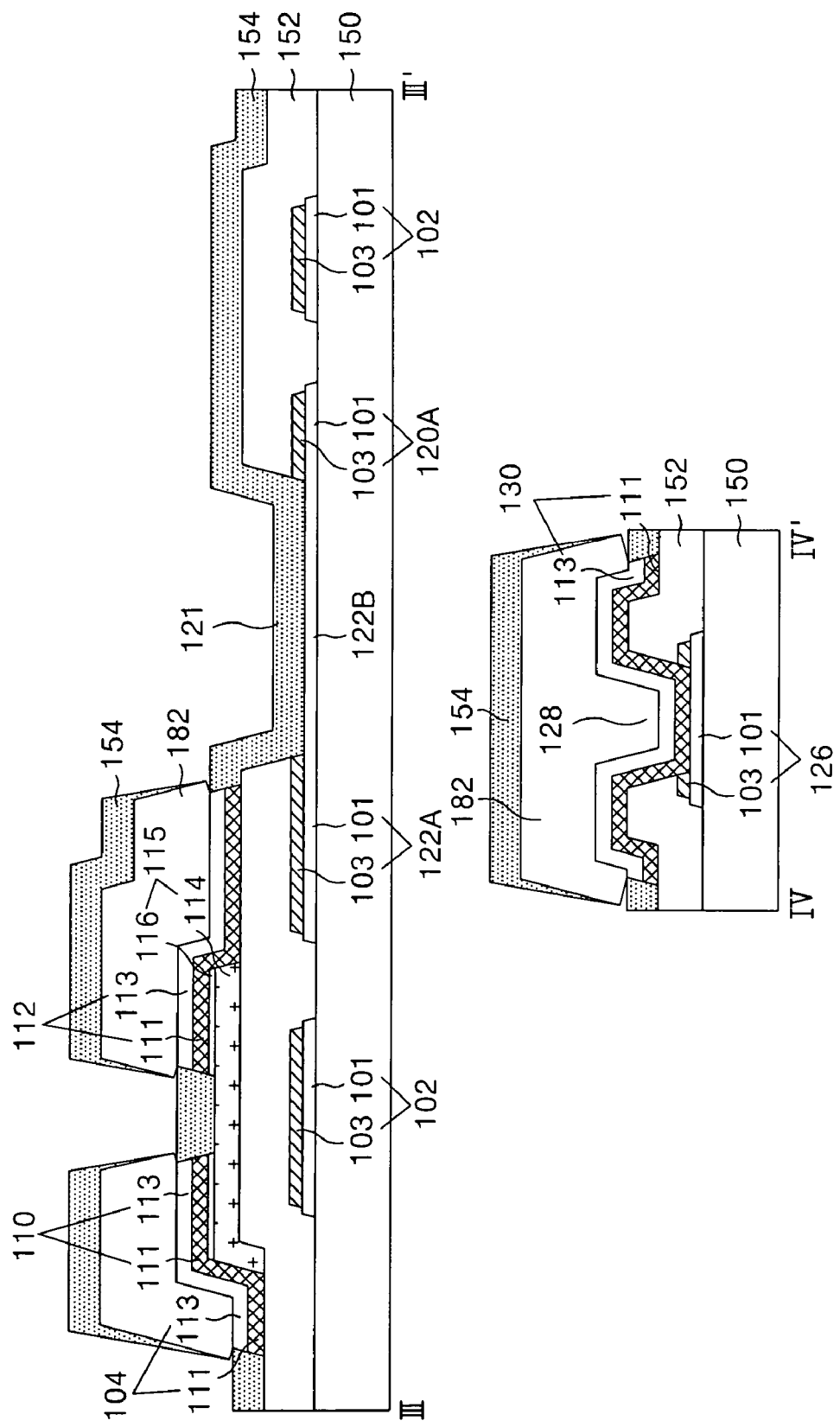

In FIG. 9d, the protective film 154 covering the photo-resist pattern 182 is entirely formed. In this case, the protective film 154 is provided on the substrate in areas in which the photo-resist pattern 182 does not exist. An opened structure is created with respect to the protective film 154 provided at the photo-resist pattern 182 by a spaced distance between the edge of the photo-resist pattern 182 and the edge of the transparent conductive pattern 113. Thus, an infiltration of a stripper into a portion between the photo-resist pattern 182 and the transparent conductive pattern 113 is facilitated at the next lift-off process, thereby improving lift-off efficiency. The protective film 154 is formed from an inorganic insulating material like the gate insulating film 152. Such a protective film 154 is formed by a deposition technique such as the PECVD or sputtering. But, it is desirable that the protective film 154 is formed by the sputtering in order to prevent a hardness of the photo-resist pattern 182 at a high temperature. Alternatively, the protective film 154 may be formed of an organic insulating material such as an acrylic organic compound, BCB or PFCB, etc.

Referring to FIG. 9e, the photo-resist pattern 182 shown in FIG. 9d and the protective film 154 provided thereon are removed by a lift-off process to thereby pattern the protective film 154. The patterned protective film 154 makes an interface with the transparent conductive pattern 113. In other words, the protective film 154 interfaces with the transparent conductive pattern 113 in areas on the substrate in which the transparent conductive pattern 113 is not located.

Accordingly, a channel length L of the thin film transistor TFT is determined by the transparent conductive pattern 113. Furthermore, a smoothing is possible in accordance with a thickness of the transparent conductive pattern 113, so that it becomes possible to prevent a rubbing badness upon an alignment treatment process such as the rubbing, etc. after forming the alignment film.

Figure 10:
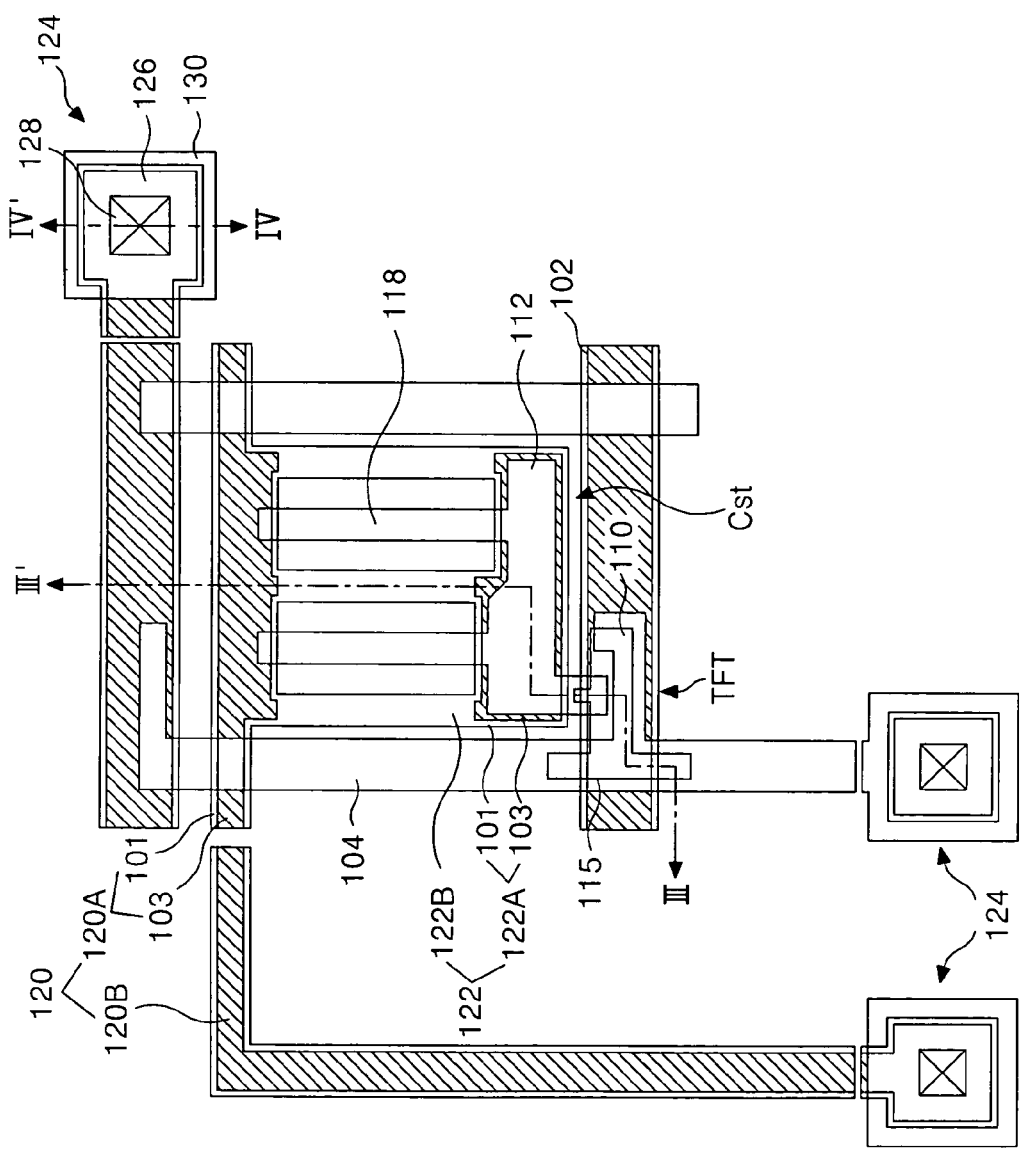
FIG. 10 is a plan view showing a portion of a thin film transistor substrate of a horizontal electric field applying type according to another embodiment of the present invention.

FIG. 10 is a plan view showing a portion of a thin film transistor substrate of a horizontal electric field applying type according to another embodiment of the present invention.

The thin film transistor substrate shown in FIG. 10 has the same elements as the thin film transistor substrate shown in FIG. 2 except that the fingers 122B of the common electrode 122 are formed only of a transparent conductive layer so that all of the fingers 122B may contribute to an aperture ratio. Therefore, an explanation as to the same elements will be omitted.

The finger part 122B of the common electrode 122 in FIG. 10 is formed from a transparent conductive layer. In other words, the finger part 122B of the common electrode 122 takes such a structure that the first conductive layer is extended from the common line 120 having a structure in which the first and second conductive layers 101 and 103 are built. As mentioned above, the finger part 122B of the common electrode 122 has a structure in which the first and second conductive layers 101 and 103 are formed similar to the common line 120 and the horizontal part 122A of the common electrode 122 in the first mask process. Next, after the gate insulating film was formed, the transmitting hole passes through an area extended from the gate insulating film until the second conductive layer 103 is formed by the second mask process. Thus, the finger part 122B of the common electrode 122 has a structure that is formed only of the first conductive layer 101, that is, a transparent conductive layer. Accordingly, the finger part 122B of the common electrode 122 can improve an aperture ratio.

Figure 11:
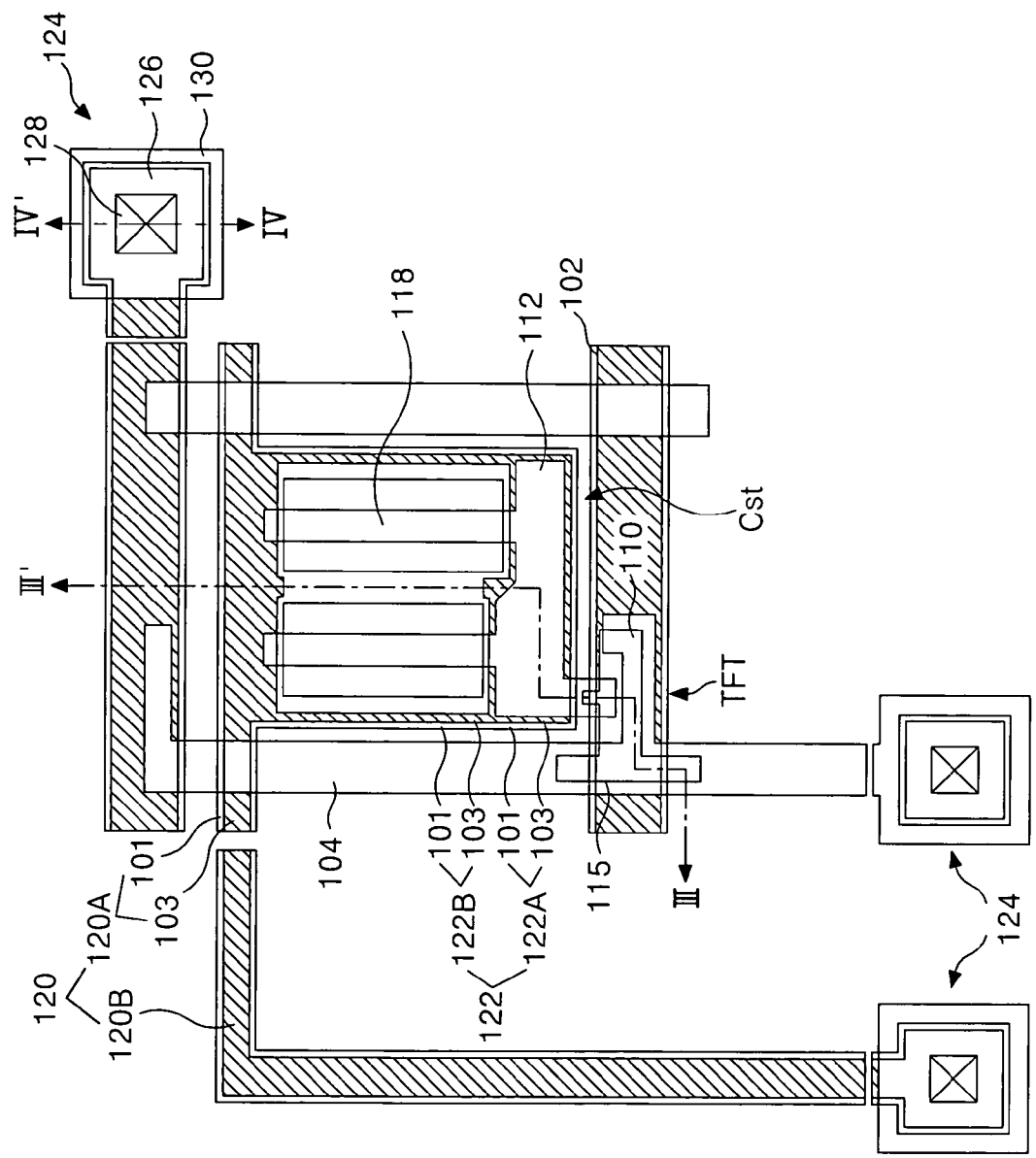
FIG. 11 is a plan view showing a portion of a thin film transistor substrate of a horizontal electric field applying type according to another embodiment of the present invention.

FIG. 11 is a plan view showing a portion of a thin film transistor substrate of a horizontal electric field applying type according to another embodiment of the present invention.

The thin film transistor substrate shown in FIG. 11 has the same elements as the thin film transistor substrate shown in FIG. 2 except that the first conductive layer 101 has a partially exposed structure so that the finger part 122B adjacent to the data line 104 of the common electrode 122 can contribute to an aperture ratio. Therefore, an explanation as to the same elements will be omitted.

Referring to FIG. 11, the finger part 122B adjacent to the data line 104 of the common electrode 122 has a structure in which the first and second conductive layers 101 and 103 are built, and one side thereof adjacent to the pixel electrode 118 has a structure in which the first conductive layer 101 is exposed. Accordingly, a portion in which the first and second conductive layers 101 and 103 are built, of the finger part 122A of the common electrode 122, may prevent a light leakage while, and a portion thereof in which the first conductive layer is exposed can contribute to an aperture ratio. As mentioned above, the finger part 122B of the common line 122 has a structure in which the first and second conductive layers 101 and 103 are formed similar to the common line 120 and the horizontal part 122A of the common electrode 122 in the first mask process. Next, after the gate insulating film was formed, a transmitting hole passing through an area extended from the gate insulating film to the second conductive layer 103 is defined at a portion of the finger part 122B of the common electrode 122 adjacent to the data line 104 by the second mask process. Thus, the first conductive layer 101 has an exposed structure.

As described above, in the thin film transistor substrate of a horizontal electric field applying type and a fabricating method thereof according to the present invention, the semiconductor pattern, the transmitting hole and the contact hole are formed with the aid of a half tone (or a diffractive exposure) mask in the second mask process.

Also, in the thin film transistor substrate of horizontal electric field applying type and the fabricating method thereof according to the present invention, the third conductive pattern group is formed and then the protective film is patterned by lifting off the photo-resist pattern used upon formation of the third conductive pattern group in the third mask process.

Accordingly, the entire process can be simplified by the three-round mask process, so that it becomes possible to reduce the material cost and the equipment investment cost, etc. as well as to improve the productivity.

Furthermore, according to the present invention, the middle finger of the common electrode is formed of a transparent conductive layer, so that it becomes possible to improve an aperture ratio.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device with a protective film patterned by a lift-off process, comprising:

a first mask process of forming a first mask pattern group including a gate line, a gate electrode connected to the gate line and a common line substantially parallel to the gate line, wherein the first mask pattern group has a first conductive layer group structure having at least double conductive layers, and a common electrode connected to the common line on a substrate;

a second mask process of forming a gate insulating film on the first mask pattern group and forming a semiconductor pattern on the gate insulating film; and a third mask process of forming a third mask pattern group including a data line, a source electrode connected to the data line and a drain electrode opposite the source electrode that have a second conductive layer group structure having at least double conductive layers, and a pixel electrode connected to the drain electrode on the gate insulating film provided with the semiconductor pattern, and a protective film interfacing with the third mask pattern group on the gate insulating film provided with the semiconductor pattern;

wherein the third mask process further includes:

forming the second conductive layer group on the gate insulating film provided with the semiconductor pattern;

forming a photo-resist pattern by the photolithography;

forming the third mask pattern group by patterning the second conductive layer group by an etching process using the photo-resist patterns;

removing an ohmic contact layer of the semiconductor pattern exposed between the source electrode and the drain electrode;

forming the protective film on the photo-resist patterns; and removing the photo-resist patterns having the protective film thereon.

2. The method as claimed in claim 1, wherein the first mask process further includes forming a lower pad electrode to be connected to one of the gate line, the data line and the common line from the first conductive layer group, wherein the second mask process further includes forming a contact hole passing through the gate insulating film to expose the lower pad electrode, and wherein the third mask process further includes forming an upper pad electrode to be connected, via the contact hole, to the lower pad electrode from the second conductive layer group.

3. The method as claimed in claim 2, wherein the contact hole passes through an upper layer of the first conductive layer group to expose the lowermost layer of the first conductive layer group.

4. The method as claimed in claim 2, wherein the second mask process further includes:

allowing the lowermost layer of a portion of the common electrode to be exposed through a transmitting hole passing through the gate insulating film and the upper layer of the first conductive layer group.

5. The method as claimed in claim 4, wherein the second mask process further includes:

forming a gate insulating film, an amorphous silicon layer and an amorphous silicon layer doped with an impurity on the first mask pattern group;

forming photo-resist patterns having different thickness by photolithography using one of a half tone mask and a diffractive exposure mask; and forming the transmitting hole, the contact holes, and the semiconductor pattern having an active layer and the ohmic contact layer by an etching process using the photo-resist pattern.

6. The method as claimed in claim 1, wherein the protective film is formed by sputtering.

7. The method as claimed in claim 1, wherein the third conductive pattern group is over-etched in comparison to the photo-resist pattern.

8. The method as claimed in claim 7, wherein the second conductive layer group is etched by wet-etching.

9. The method as claimed in claim 1, wherein a lowermost layer of the first conductive layer group and an uppermost layer of the second conductive layer group include one of a transparent conductive layer, Ti and W.

10. The method as claimed in claim 9, wherein an upper layer other than the lowermost layer in the first conductive layer group and another lower layer other than the uppermost layer in the second conductive layer group include a single layer formed of Mo, Ti, Cu, AlNd, Al, Cr, a Mo-alloy, a Cu-alloy or an Al-alloy or at least double layers.

11. The method as claimed in claim 1, further comprising:

forming a storage capacitor by overlapping the drain electrode with a portion of the common electrode, wherein the gate insulating film is therebetween.

12. The method as claimed in claim 1, wherein at least one of the first and second conductive groups has step coverage having a stepwise shape.

13. The method as claimed in claim 1, wherein the ohmic contact layer and edges of the source electrode and the drain electrode have a step coverage having a stepwise shape.

* * * * *